United States Patent
Hosseini et al.

(10) Patent No.: US 12,538,346 B2
(45) Date of Patent: Jan. 27, 2026

(54) SIDELINK COLLISION HANDLING FOR INTER USER EQUIPMENT COORDINATION

(71) Applicant: QUALCOMM Incorporated, San Diego, CA (US)

(72) Inventors: Seyedkianoush Hosseini, San Diego, CA (US); Wei Yang, San Diego, CA (US); Yi Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 98 days.

(21) Appl. No.: 17/444,532

(22) Filed: Aug. 5, 2021

(65) Prior Publication Data

US 2022/0046653 A1 Feb. 10, 2022

Related U.S. Application Data

(60) Provisional application No. 62/706,305, filed on Aug. 7, 2020.

(51) Int. Cl.
*H04W 72/02* (2009.01)
*H04W 72/20* (2023.01)
*H04W 72/56* (2023.01)
*H04W 76/14* (2018.01)
*H04W 92/18* (2009.01)

(52) U.S. Cl.
CPC ........... *H04W 72/56* (2023.01); *H04W 72/02* (2013.01); *H04W 72/20* (2023.01); *H04W 92/18* (2013.01)

(58) Field of Classification Search
CPC ....... H04W 92/18; H04W 76/14; H04W 4/40; H04W 72/02; H04W 72/56; H04W 72/23; H04W 72/0446; H04W 4/46
See application file for complete search history.

(56) References Cited

U.S. PATENT DOCUMENTS

| | | | | |
|---|---|---|---|---|
| 11,166,292 | B2* | 11/2021 | Huang | H04W 72/0446 |
| 2018/0255531 | A1* | 9/2018 | Xu | H04W 72/20 |
| 2018/0332585 | A1* | 11/2018 | Faurie | H04W 72/12 |
| 2019/0045521 | A1* | 2/2019 | Hong | H04W 72/21 |
| 2019/0387377 | A1* | 12/2019 | Zhang | H04W 52/383 |

(Continued)

FOREIGN PATENT DOCUMENTS

| | | |
|---|---|---|
| CN | 110521264 A | 11/2019 |
| WO | 2017026973 A1 | 2/2017 |

(Continued)

OTHER PUBLICATIONS

International Search Report and Written Opinion—PCT/US2021/071130—ISA/EPO—Dec. 7, 2021.

(Continued)

*Primary Examiner* — Sai Aung
(74) *Attorney, Agent, or Firm* — Harrity & Harrity, LLP

(57) ABSTRACT

Various aspects of the present disclosure generally relate to wireless communication. In some aspects, a user equipment (UE) may identify a collision between an inter-UE coordination communication to be transmitted or received by the UE and another communication. The UE may perform at least one of the inter-UE coordination communication or the other communication based at least in part on a resolution of the collision based at least in part on a priority rule. Numerous other aspects are provided.

26 Claims, 14 Drawing Sheets

400

(56) References Cited

U.S. PATENT DOCUMENTS

| | | | | |
|---|---|---|---|---|
| 2020/0022089 | A1* | 1/2020 | Guo | H04W 52/242 |
| 2020/0029318 | A1* | 1/2020 | Guo | H04L 1/1822 |
| 2020/0196255 | A1* | 6/2020 | Cheng | H04L 5/0064 |
| 2020/0229210 | A1 | 7/2020 | Bharadwaj et al. | |
| 2020/0314612 | A1* | 10/2020 | Kang | H04W 4/70 |
| 2020/0344722 | A1* | 10/2020 | He | H04W 72/02 |
| 2021/0185645 | A1* | 6/2021 | Huang | H04W 72/1215 |
| 2021/0204307 | A1* | 7/2021 | Lee | H04W 76/14 |
| 2021/0306824 | A1* | 9/2021 | Li | H04W 4/40 |
| 2022/0070879 | A1* | 3/2022 | Ryu | H04W 72/20 |
| 2022/0217741 | A1* | 7/2022 | Yoshioka | H04W 72/1263 |
| 2022/0322359 | A1* | 10/2022 | Ye | H04W 72/02 |
| 2022/0330266 | A1* | 10/2022 | Huang | H04W 72/56 |
| 2022/0408412 | A1* | 12/2022 | Lee | H04L 1/1893 |

FOREIGN PATENT DOCUMENTS

| | | |
|---|---|---|
| WO | 2020142992 A1 | 7/2020 |
| WO | 2020145633 A1 | 7/2020 |

OTHER PUBLICATIONS

LG Electronics, et al., "Summary of Email Discussion on Sidelink Enhancements in Rel-17," 3GPP Draft, 3GPP TSG RAN Meeting #85, RP-192296 Summary of SL ENH REV#1, 3rd Generation Partnership Project (3GPP), Mobile Competence Centre, 650, Route Des Lucioles, F-06921, Sophia-Antipolis Cedex, France, vol. TSG RAN. No. Newport Beach, USA, Sep. 16, 2019-Sep. 20, 2019, Sep. 20, 2019 (Sep. 20, 2019), 80 pages, XP051779515, Retrieved from the Internet: URL: http://www.3gpp.org/ftp/Meetings_3GPP_SYNC/RAN/Docs/RP-192296.zip [retrieved on Sep. 20, 2019] sections: "Proposal 5" and "Proposal 6" p. 80-p. 82.

Qualcomm Incorporated: "Summary of Coexistence Aspects in NR-V2X (AI 7.2.4.4)," 3GPP Draft, 3GPP TSG RAN WG1 Meeting #96bis, R1-1905722_Summary_NR_V2X- AI7.2.4.4-Coexistence, 3rd Generation Partnership Project (3GPP), Mobile Competence Centre, 650, Route Des Lucioles, F-06921, Sophia-Antipolis Cedex, France, vol. RAN WG1. No. Xian, China, Apr. 8, 2019-Apr. 12, 2019, Apr. 15, 2019 (Apr. 15, 2019), XP051707779, 6 pages, Retrieved from the Internet: URL: http://www.3gpp.org/ftp/tsg%5Fran/WG1%5FRL1/TSGR1%5F96b/Docs/R1%2D1905722%2Ezip [retrieved on Apr. 15, 2019] sections: "Issue 1-1," and "Issue 1-3" p. 2-p. 5.

* cited by examiner

SIDELINK COLLISION HANDLING FOR INTER USER EQUIPMENT COORDINATION

CROSS-REFERENCE TO RELATED APPLICATION

This patent application claims priority to U.S. Provisional Patent Application No. 62/706,305, filed on Aug. 7, 2020, entitled "SIDELINK COLLISION HANDLING FOR INTER USER EQUIPMENT COORDINATION," and assigned to the assignee hereof. The disclosure of the prior application is considered part of and is incorporated by reference into this patent application.

INTRODUCTION

Aspects of the present disclosure generally relate to wireless communication and to techniques and apparatuses for inter user equipment coordination.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication performed by a user equipment (UE) may include identifying a collision between an inter-UE coordination communication to be transmitted or received by the UE and another communication. The method may include determining a resolution of the collision based at least in part on a priority rule. The method may include performing at least one of the inter-UE coordination communication or the other communication based at least in part on the resolution.

In some aspects, a UE for wireless communication may include a memory and one or more processors coupled to the memory. The one or more processors may be configured to identify a collision between an inter-UE coordination communication to be transmitted or received by the UE and another communication. The one or more processors may be configured to determine a resolution of the collision based at least in part on a priority rule. The one or more processors may be configured to perform at least one of the inter-UE coordination communication or the other communication based at least in part on the resolution.

In some aspects, a non-transitory computer-readable medium storing a set of instructions for wireless communication may include one or more instructions that, when executed by one or more processors of a UE, cause the UE to identify a collision between an inter-UE coordination communication to be transmitted or received by the UE and another communication. The one or more instructions, when executed by one or more processors of the UE, may cause the UE to determine a resolution of the collision based at least in part on a priority rule. The one or more instructions, when executed by one or more processors of the UE, may cause the UE to perform at least one of the inter-UE coordination communication or the other communication based at least in part on the resolution.

In some aspects, an apparatus for wireless communication includes means for identifying a collision between an inter-UE coordination communication to be transmitted or received by the apparatus and another communication. The apparatus may include means for determining a resolution of the collision based at least in part on a priority rule. The apparatus may include means for performing at least one of the inter-UE coordination communication or the other communication based at least in part on the resolution.

Some aspects described herein relate to a method of wireless communication performed by a base station. The method may include identifying a priority rule, of a plurality of priority rules, for resolving a collision between an inter-user equipment (inter-UE) coordination communication to be transmitted or received by a UE and another communication. The method may include transmitting an indication of the priority rule.

Some aspects described herein relate to an apparatus for wireless communication at a base station. The apparatus may include a memory. The apparatus may include one or more processors, coupled to the memory, configured to identify a priority rule, of a plurality of priority rules, for resolving a collision between an inter-UE coordination communication to be transmitted or received by a UE and another communication. The one or more processors may be configured to transmit an indication of the priority rule.

Some aspects described herein relate to a non-transitory computer-readable medium that stores a set of instructions for wireless communication by a base station. The set of instructions, when executed by one or more processors of the base station, may cause the base station to identify a priority rule, of a plurality of priority rules, for resolving a collision between an inter-UE coordination communication to be transmitted or received by a UE and another communication. The set of instructions, when executed by one or more processors of the base station, may cause the base station to transmit an indication of the priority rule.

Some aspects described herein relate to an apparatus for wireless communication. The apparatus may include means for identifying a priority rule, of a plurality of priority rules, for resolving a collision between an inter-UE coordination communication to be transmitted or received by a UE and another communication. The apparatus may include means for transmitting an indication of the priority rule.

Aspects generally include a method, apparatus, system, computer program product, non-transitory computer-readable medium, user equipment, base station, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
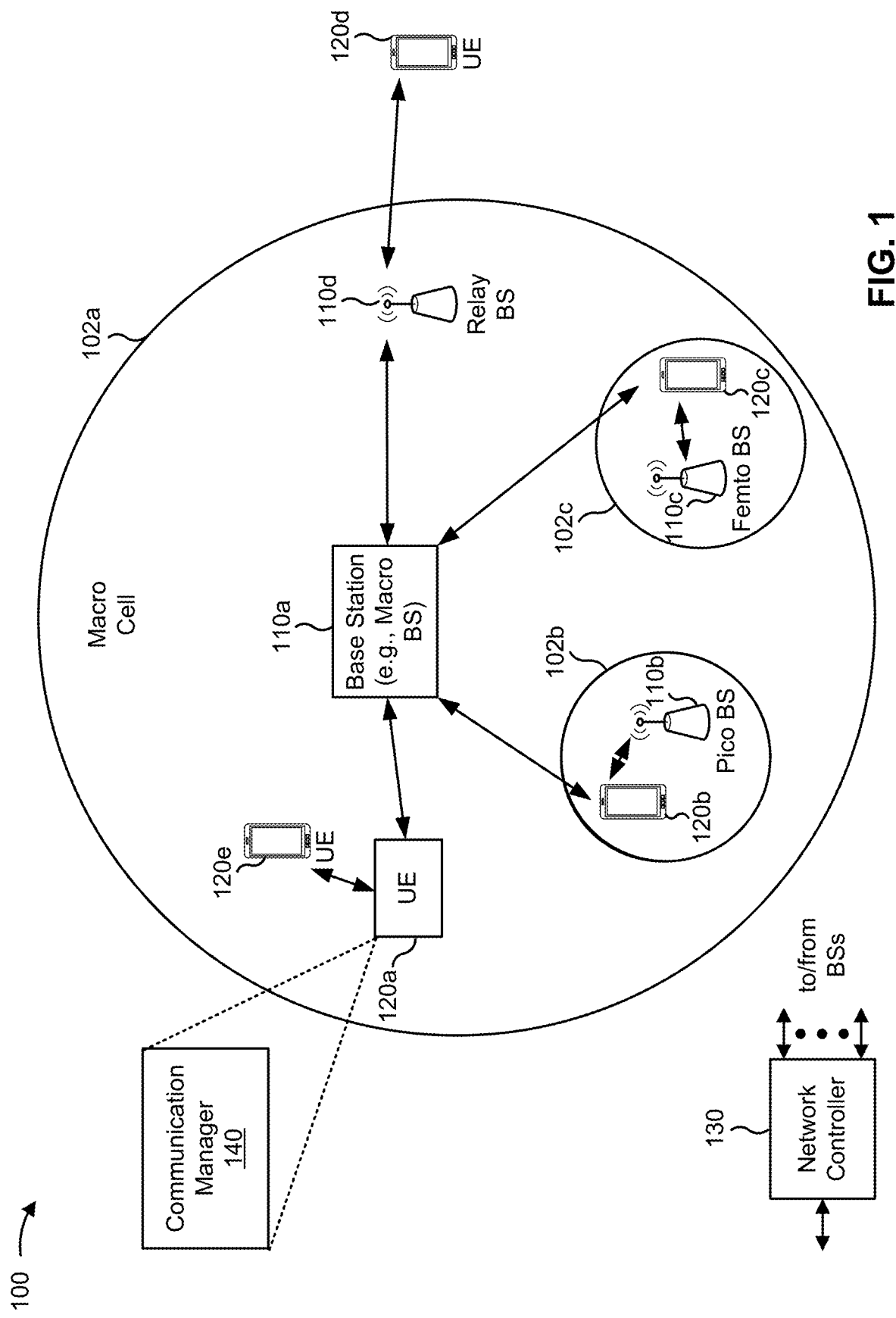
FIG. 1 is a diagram illustrating an example of a wireless network, in accordance with the present disclosure.

Inter-user equipment (UE) coordination assists a first UE with resource selection in order to facilitate sidelink communications by a second UE. Sidelink communications are communications directly between UEs that do not pass via a base station. "Resource selection" refers to selecting a resource on which to transmit or receive a communication. For example, the second UE, or a base station, may transmit an inter-UE coordination request that the first UE perform an inter-UE coordination operation. The first UE may identify a set of resources in a selection window based at least in part on receiving the inter-UE coordination request and based at least in part on a sensing operation and may transmit a coordination report to the second UE indicating the set of resources. The second UE may select a resource of the set of resources and may communicate on the selected resource. In some aspects, the second UE may select a resource based at least in part on the set of resources (e.g., the set of resources may be non-binding for the second UE). Inter-UE coordination signaling can also be used to indicate non-preferred resources (that is, resources that the first UE would prefer the second UE not use for a communication).

In some aspects, collisions may occur between inter-UE coordination traffic (e.g., an inter-UE coordination request or a coordination report) and another communication, such as based at least in part on the inter-UE coordination traffic and the other communication using overlapped resources. For example, the other communication may include a sidelink communication or a communication on a Uu interface (e.g., an uplink communication or a downlink communication). In some situations, an inter-UE coordination communication may be more beneficial to the operation of the UE than another communication. In other situations, another communication may be more beneficial to the operation of the UE or another device than the inter-UE coordination communication. Furthermore, different UEs may have different capabilities with regard to simultaneous transmission and reception, or with regard to power control parameters for simultaneous transmissions. Thus, without a prioritization scheme that indicates how to handle potential collisions between different channels, operations of the UE or other devices may be negatively impacted due to suboptimal prioritization, thereby using computing and communication resources of the UE or the other devices.

Some techniques and apparatuses described herein provide resolution of a potential collision between an inter-UE cooperation communication and another communication, such that an actual collision does not occur upon transmission of the inter-UE cooperation communication and the other communication. For example, some techniques and apparatuses described herein provide resolution of collisions associated with sidelink transmissions, or collisions associated with Uu interface communication collisions. In some aspects, the resolution may be based at least in part on whether the colliding communication is associated with a sidelink interface or a Uu interface. Thus, allocation of network resources is improved by providing resolution of collisions between inter-UE cooperation communications and other communications, thereby improving reliability of communications and conserving computing and communication resources.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with UEs and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In some aspects, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As shown in FIG. 1, the UE 120 may include a communication manager 140. As described in more detail elsewhere herein, the communication manager 140 may provide means for identifying a collision between an inter-UE coordination communication to be transmitted or received by the UE and another communication; means for determining a resolution of the collision based at least in part on a priority rule; and means for performing at least one of the inter-UE coordination communication or the other communication based at least in part on the resolution. Additionally, or alternatively, the communication manager 140 may perform one or more other operations described herein.

As indicated above, FIG. 1 is provided merely as an example. Other examples may differ from what is described with regard to FIG. 1.

Figure 2:
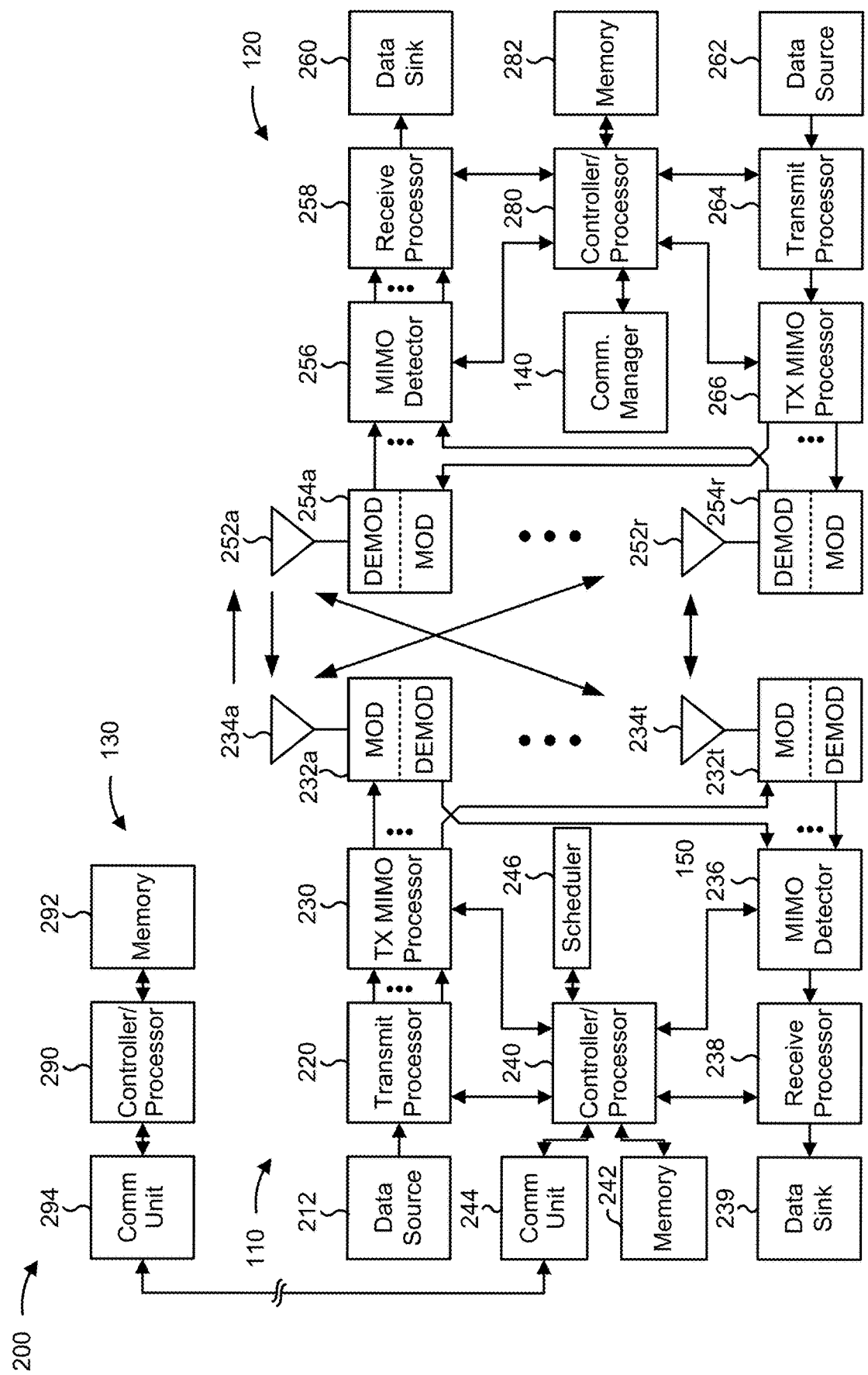
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The controller/processor 280 may provide, for UE 120, means for determining, identifying, or selecting, among other examples, such as using a determination circuit, an identification circuit, a selection circuit, and/or the like. The receive processor 258 may provide, for UE 120, means for receiving data or control information, among other examples, from, for example, BS 110. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter. In some aspects, one or more components of UE 120 may be included in a housing.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports comprising RSRP, RSSI, RSRQ, and/or CQI) from controller/processor 280. The transmit processor 264 may provide, for UE 120, means for transmitting data or control information, among other examples, to, for example, BS 110. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide, for BS 110, means for receiving data or control information, among other examples, from, for example, UE 120. Receive processor 238 may provide the decoded data to a data sink 239 and the decoded control information to controller/processor 240. The controller/processor 240 may provide means for, for example, determining, selecting, identifying, or detecting, among other examples. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein.

Controller/processor 240 of base station 110, controller/processor 280 of UE 120, and/or any other component(s) of FIG. 2 may perform one or more techniques associated with collision resolution for inter-UE coordination, as described in more detail elsewhere herein. For example, controller/processor 240 of base station 110, controller/processor 280 of UE 120, and/or any other component(s) of FIG. 2 may perform or direct operations of, for example, process 900 of FIG. 9, process 1200 of FIG. 12, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 900 of FIG. 9, process 1200 of FIG. 12, and/or other processes as described herein. In some aspects, executing instructions may include running the instructions, converting the instructions, compiling the instructions, and/or interpreting the instructions, among other examples.

In some aspects, the UE 120 may provide means for identifying a collision between an inter-UE coordination communication to be transmitted or received by the UE and another communication; means for determining a resolution of the collision based at least in part on a priority rule; means for performing at least one of the inter-UE coordination communication or the other communication based at least in part on the resolution; and/or the like. Additionally, or alternatively, the UE 120 may include means for performing one or more other operations described herein. In some aspects, such means may include the communication manager 140. Additionally, or alternatively, such means may include one or more other components of the UE 120 described in connection with FIG. 2, such as controller/processor 280, transmit processor 264, TX MIMO processor 266, MOD 254, antenna 252, DEMOD 254, MIMO detector 256, receive processor 258, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided merely as an example. Other examples may differ from what is described with regard to FIG. 2.

Figure 3:
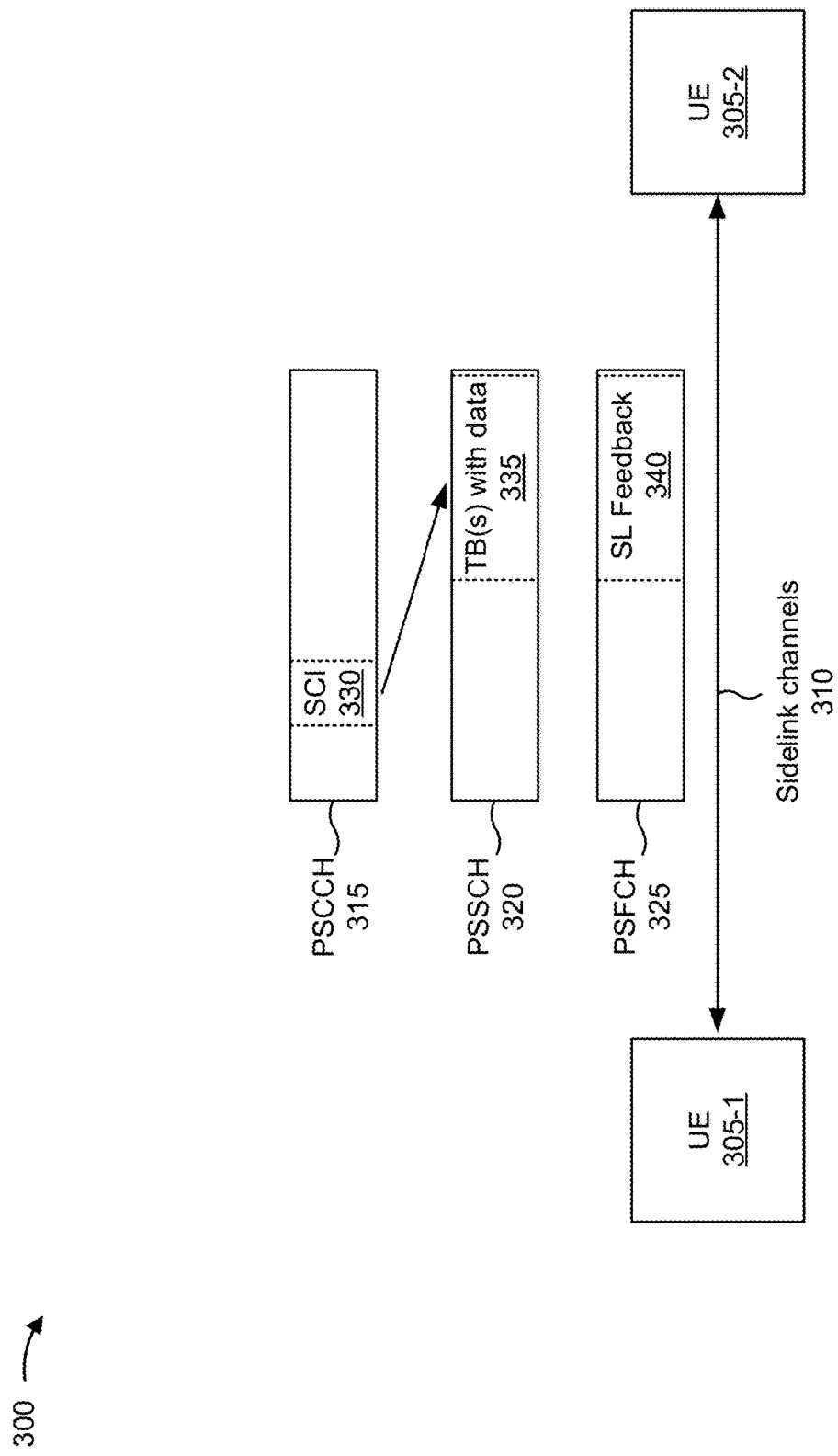
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, vehicle-to-person (V2P) communications, and/or the like), mesh networking, and/or the like. In some aspects, the UEs 305 (e.g., UE 305-1 and/or UE 305-2) may be similar to one or more other UEs described elsewhere herein, such as UE 120. In some aspects, the one or more sidelink channels 310 may use a ProSe Sidelink (PC5) interface and/or may operate in a high frequency band (e.g., the 5.9 GHz band). Additionally, or alternatively, the UEs 305 may synchronize timing of transmission time intervals (TTIs) (e.g., frames, subframes, slots, symbols, and/or the like) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, spatial resources, and/or the like) where a transport block (TB) 335 may be carried on the PSSCH 320. The TB 335 may include data. The PSFCH 325 may be used to communicate sidelink feedback 340, such as hybrid automatic repeat request (HARD) feedback (e.g., acknowledgement or negative acknowledgement (ACK/NACK) information), transmit power control (TPC), a scheduling request (SR), and/or the like.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by the UE 305 (e.g., rather than a base station 110). In some aspects, the UE 305 may perform resource selection and/or scheduling by sensing channel availability for transmissions. For example, the UE 305 may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, may measure an RSRQ parameter (e.g., a PSSCH-RSRQ parameter) associated with various sidelink channels, and/or the like, and may select a channel for transmission of a sidelink communication based at least in part on the measurement(s). In some aspects, the UE 305 may select a resource randomly.

Additionally, or alternatively, the UE 305 may perform resource selection and/or scheduling using SCI 330 received in the PSCCH 315, which may indicate occupied resources, channel parameters, and/or the like. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, an MCS to be used for the upcoming sidelink transmission, and/or the like. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
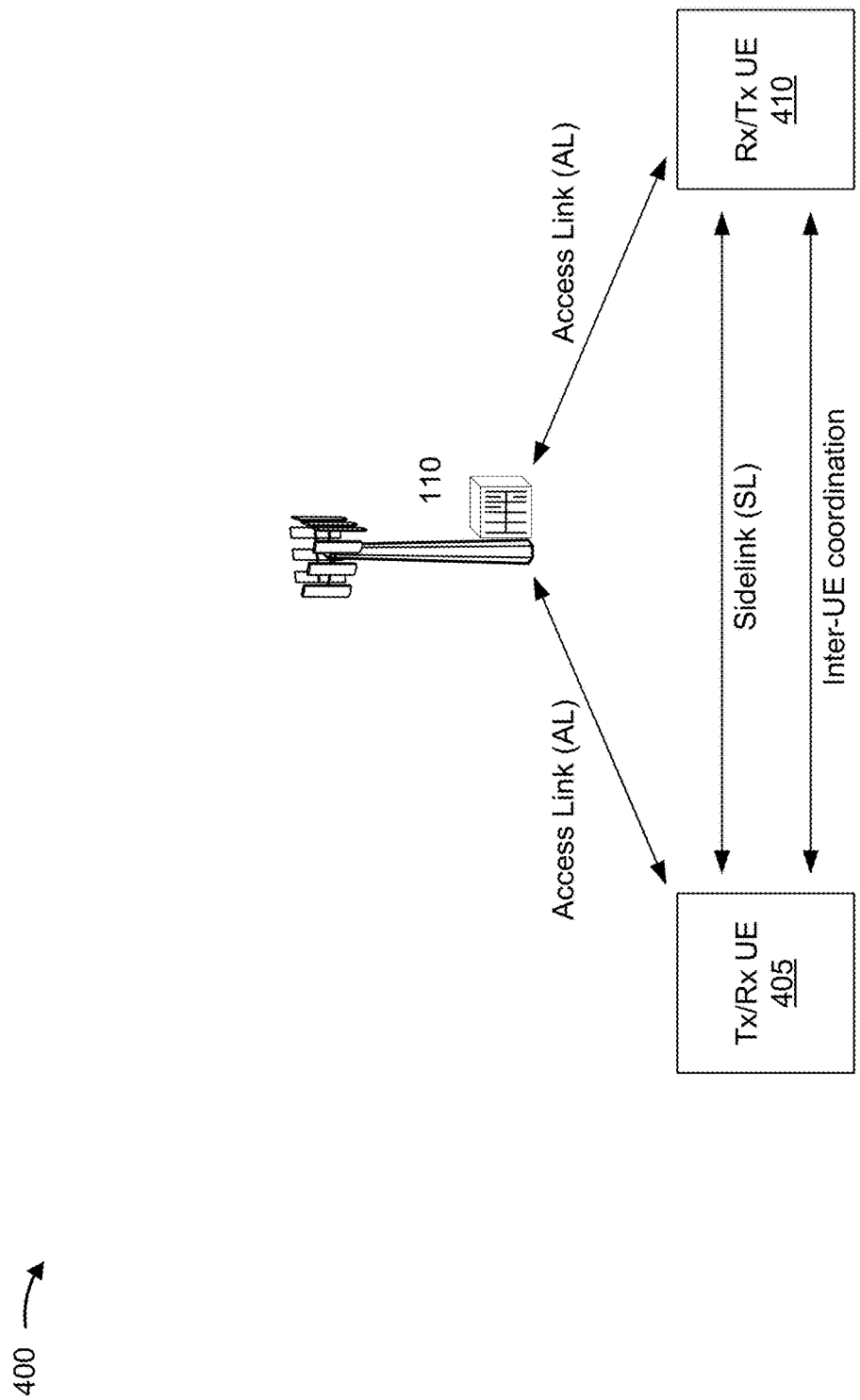
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may be similar to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 4 is provided as an example. Other examples may differ from what is described with respect to FIG. 4.

Figure 5:
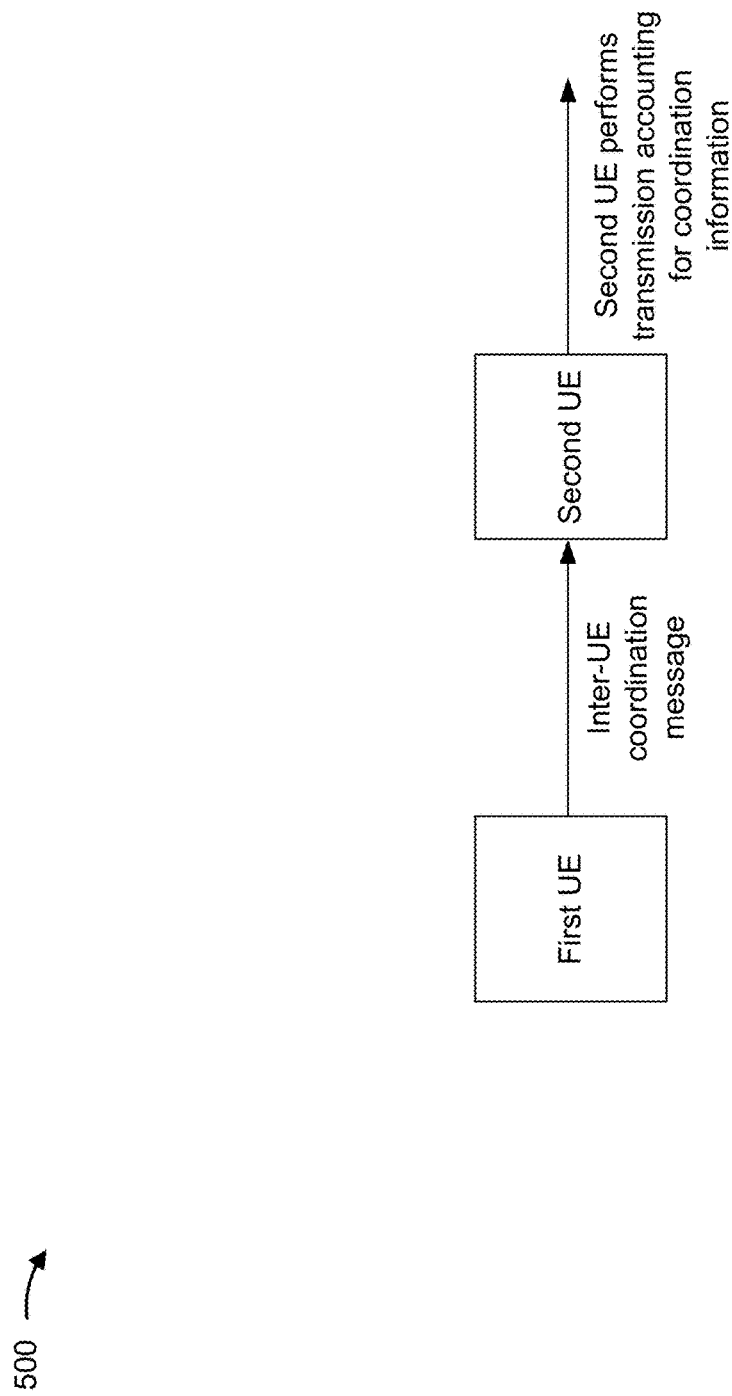
FIG. 5 is a diagram illustrating an example of coordination signaling, in accordance with the present disclosure.

FIG. 5 is a diagram illustrating an example 500 of coordination signaling, in accordance with the present disclosure.

In example 500, a first UE (e.g., UE 120a) exchanges inter-UE coordination signaling with a second UE (e.g., UE 120e). The first UE and the second UE may operate in an in-coverage mode, a partial coverage mode, an out-of-coverage mode, and/or the like. For example, the first UE may determine a set of sidelink resources available for a resource allocation. The first UE may determine the set of sidelink resources based at least in part on determining that the set of sidelink resources are to be selected, or based at least in part on a request, referred to herein as an inter-UE coordination request, received from the second UE or a base station. In some aspects, the first UE may determine the set of sidelink resources based at least in part on a sensing operation, which may be performed before receiving an inter-UE coordination request or after receiving the inter-UE coordination request. The first UE may transmit the set of available resources to the second UE via inter-UE coordination signaling (shown as a coordination message, and referred to in some aspects as a coordination report). The first UE may transmit the set of available resources using an NR sidelink resource allocation mode 2. In the NR sidelink resource allocation mode 2, resource allocation is handled by UEs (e.g., in comparison to an NR sidelink resource allocation mode 1, in which resource allocation is handled by a scheduling entity such as a base station). The second UE may select a sidelink resource for a transmission from the second UE based at least in part on the set of available resources received from the first UE. As shown, the second UE may perform the transmission accounting for the coordination information (e.g., via a sidelink resource indicated by the coordination report, and/or the like). Inter-UE coordination signaling related to resource allocation may reduce collisions between the first UE and the second UE. Inter-UE coordination signaling related to resource allocation may reduce a power consumption for the first UE and/or the second UE.

As indicated above, FIG. 5 is provided as an example. Other examples may differ from what is described with respect to FIG. 5.

Figure 6:
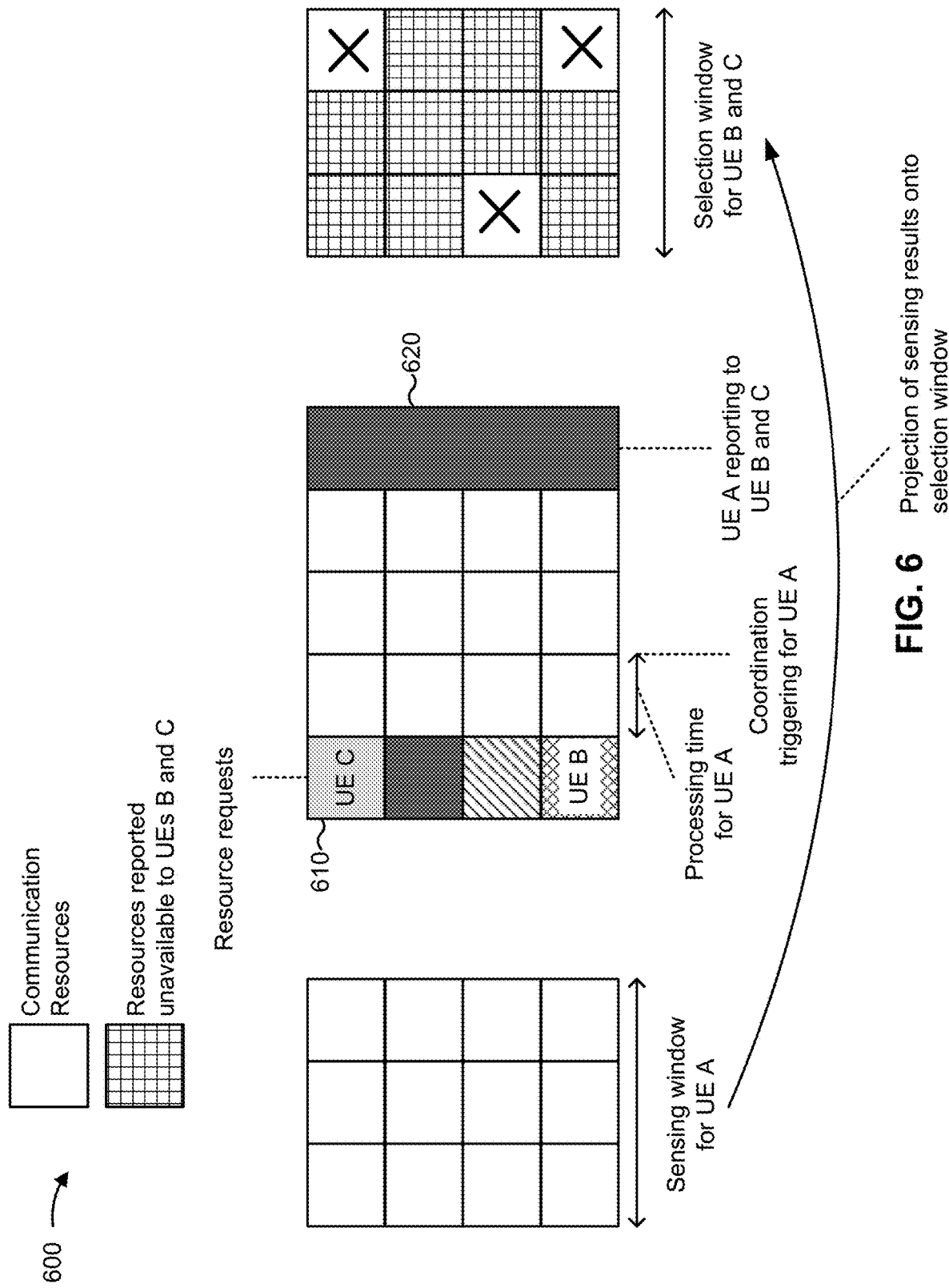
FIG. 6 is a diagram illustrating an example of resource sensing for sidelink inter-UE coordination, in accordance with the present disclosure.

FIG. 6 is a diagram illustrating an example 600 of resource sensing for sidelink inter-UE coordination, in accordance with the present disclosure.

As shown in FIG. 6, during a sensing window, a UE A (which may correspond to, for example, UE 120a) may coordinate with other UEs, such as a UE B (which may correspond to, for example, UE 120e) and a UE C. For example, UEs B and/or C may request assistance from UE A in determining whether resources are available for communication. In another example, UE A may receive a request from a BS or a relay BS to assist with inter-UE coordination. In yet another example, UE A may autonomously determine to transmit a coordination report, such as based at least in part on observed network conditions.

UE A may, during a sensing window, monitor for resource availability. The UE A may detect an inter-UE coordination request from, for example, UE B, UE C, and other UEs, on the resources shown by reference number 610. As shown, UE A may experience a processing delay between when UE A detects a request for resources and when UE A has processed the request and is triggered to transmit a coordination report to identify whether resources are available on the resource shown by reference number 620. In some aspects, the UE A may determine to transmit the coordination report (e.g., without receiving an inter-UE coordination request).

As further shown in FIG. 6, UE A may transmit reporting regarding whether resources are available to UE B, UE C, and/or other UEs. This reporting may be referred to as a coordination report or inter-UE coordination reporting. The transmission of the reporting may occur a threshold processing time before a selection window during which UE A, UE B, UE C, and other UEs may use resources that UE A has identified as available of unavailable. As shown, UE A identifies one or more resources as available to UE B and UE C and other resources as unavailable to UE B and UE C.

As indicated above, FIG. 6 is provided as an example. Other examples may differ from what is described with respect to FIG. 6.

Figure 7:
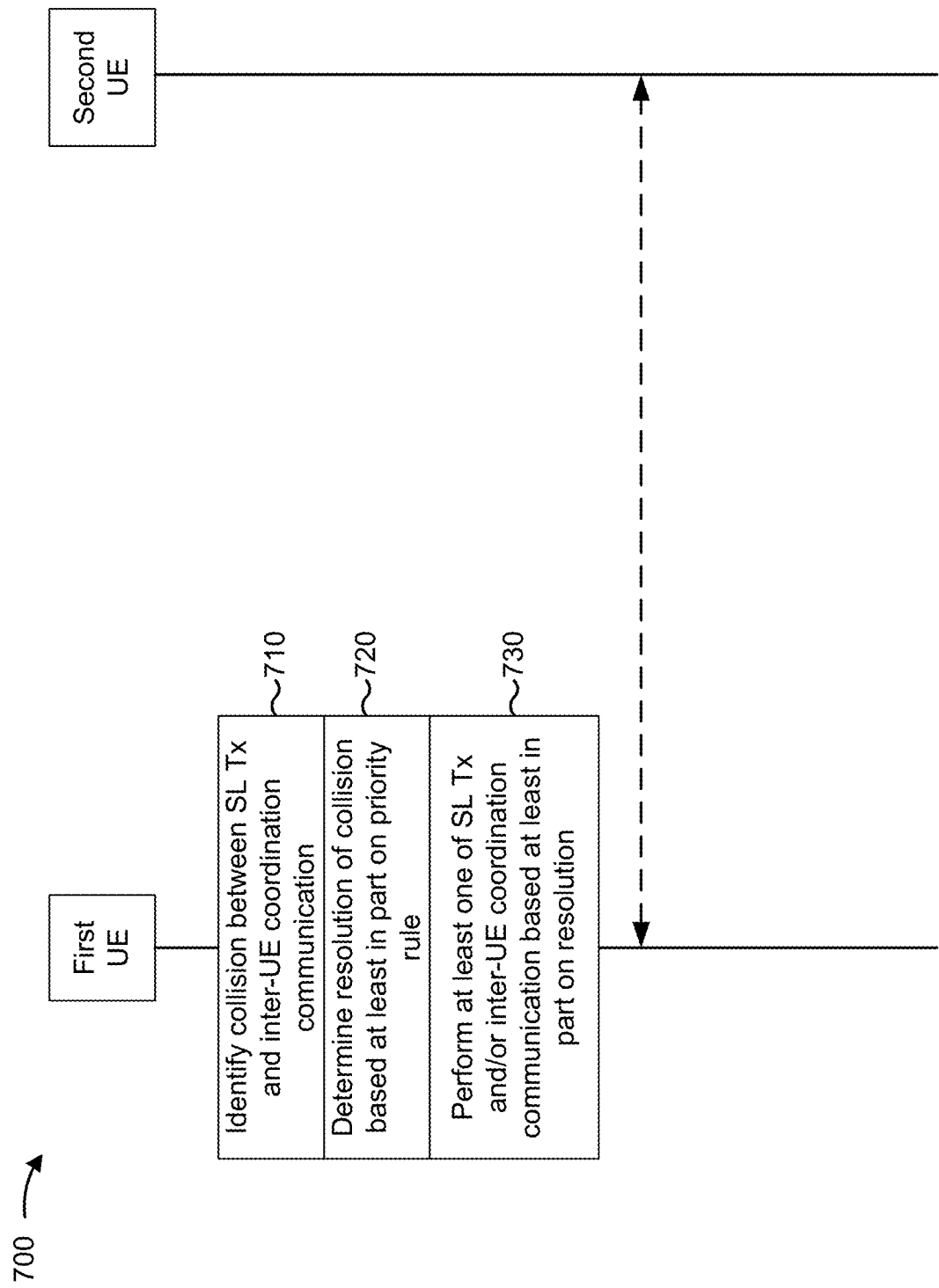
FIGS. 7 and 8 are diagrams illustrating examples of resolving a collision between an inter-UE coordination communication and another communication, in accordance with the present disclosure.
Figure 8:
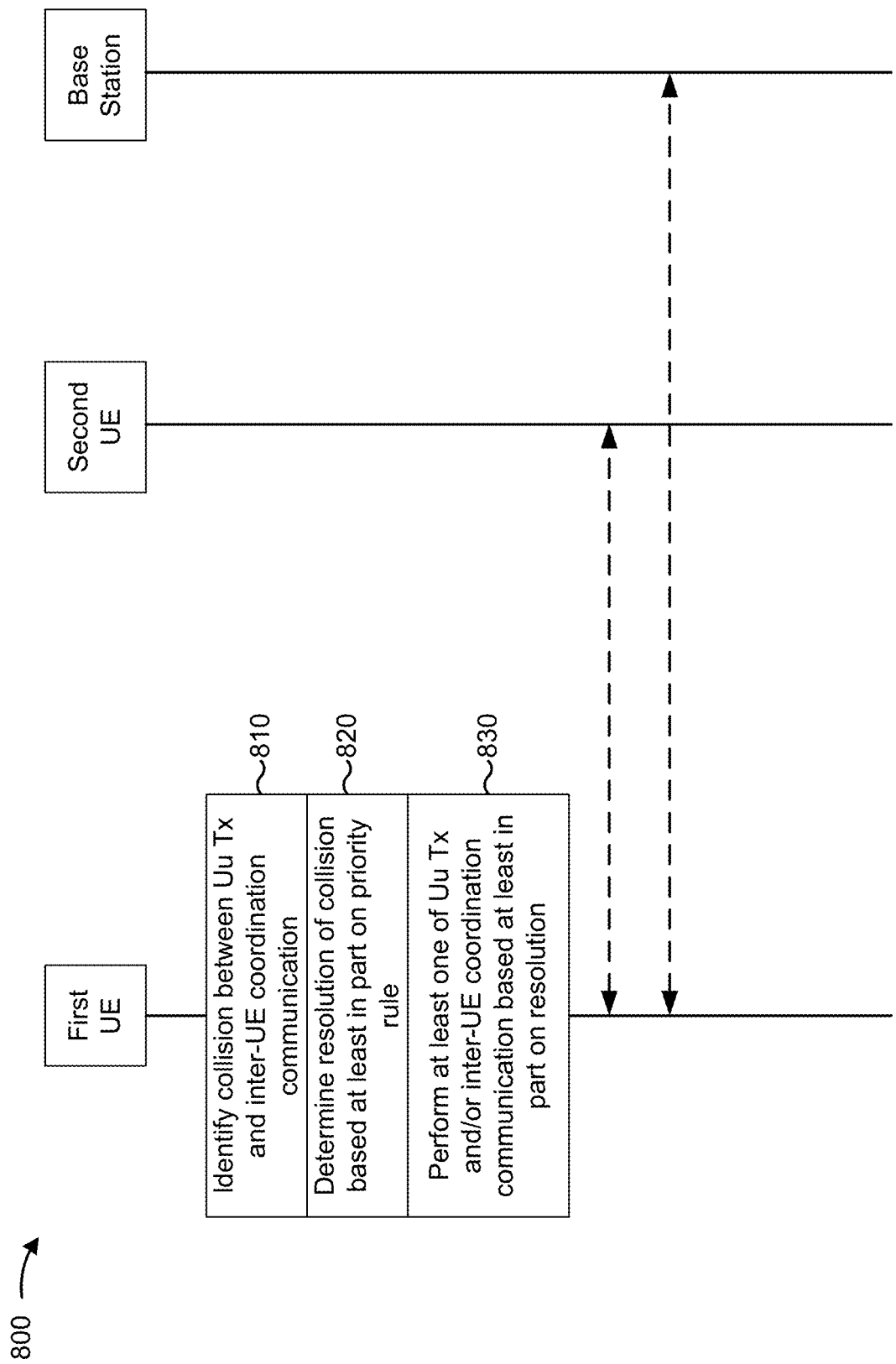

FIGS. 7 and 8 are diagrams illustrating examples 700 and 800 of resolving a collision between an inter-UE coordination communication and another communication, in accordance with the present disclosure. As shown, example 700 includes a first UE and a second UE (e.g., UE 120, UE 305, UE 405). Example 800 includes the first UE and the second UE as well as a base station (e.g., BS 110). The first UE and the second UE may communicate with each other via a sidelink interface such as a PC5 interface. In example 800, the first UE and the base station may communicate with each other via a radio access interface, such as a Uu interface, on an uplink and/or a downlink.

As shown in FIG. 7, and by reference number 710, the first UE may identify a collision between an inter-UE coordination communication and another communication. Here, the other communication is a sidelink (SL) transmission (Tx), which can be from the first UE to the second UE or from the second UE to the first UE. In some aspects, the inter-UE coordination communication and the other communication may both be between the first UE and the second UE. In some aspects, the inter-UE coordination communication and the other communication may be between the first UE and different UEs (e.g., one of the inter-UE coordination communication or the other communication may be between the first UE and a third UE not shown in FIG. 7). The inter-UE coordination communication may include an inter-UE coordination request, a coordination report (also referred to as an inter-UE coordination report), and/or the like. The other communication may include a transmission on a PSCCH, a PSSCH, a PSFCH, and/or the like. The first UE may identify the collision based at least in part on respective resource allocations of the inter-UE coordination communication and the other communication, based at least in part on sidelink control information associated with the other communication, and/or the like. For example, the first UE may determine or receive information identifying respective resource allocations of the inter-UE coordination communication and the other communication. As another example, the first UE may receive sidelink control information associated with the other communication and may identify the collision based at least in part on the sidelink control information.

As used herein, a "collision" refers to two or more communications that use overlapped resources. In some cases, a UE may not be able to simultaneously transmit or receive the two or more communications (depending, for example, on capabilities of the UE). In some aspects, two communications associated with a collision may be scheduled to at least partially overlap in frequency and/or in time, or the same set of resources may be selected (e.g., reserved, scheduled) for the two communications, such that the two communications would collide if both were transmitted. The techniques described herein provide resolution of such a potential collision so that an actual collision between two or more communications does not occur, thereby improving reliability of communications.

In some aspects, the inter-UE coordination communication may be requested by a UE. For example, the first UE may transmit an inter-UE coordination request to the second UE, and the second UE may respond with a coordination report. As another example, the first UE may receive an inter-UE coordination request from the second UE, and the first UE may respond with a coordination report. In some aspects, the inter-UE coordination communication may be requested by a base station. For example, the base station (or a relay) may transmit an inter-UE coordination request to the first UE or the second UE, which may cause the first UE or the second UE to provide a coordination report to the second UE or the first UE, respectively. In some aspects, the first UE or the second UE may autonomously determine to perform an inter-UE cooperation operation and may therefore transmit a coordination report without having received an inter-UE coordination request. Any of the above inter-UE coordination communications can be involved in the collision as the inter-UE coordination communication.

As shown by reference number 720, the first UE may determine a resolution of the collision. In some aspects, determining a resolution of the collision may include selecting one of the two communications to transmit or receive. For example, the first UE may drop at least part of one of the communications and receive or transmit at least part of the other of the two communications. In some aspects, determining a resolution of the collision may include determining a power control parameter for simultaneous transmission of the two communications. For example, a communication that is prioritized may be associated with a higher transmit power than a communication that is deprioritized. In some aspects, the resolution of the collision may be based at least in part on a simultaneous transmission or reception capability of the first UE. For example, if the first UE is capable of only a single transmission or reception at a given time, then the first UE may drop one of the two communications. If the first UE is capable of two simultaneous transmissions, then the first UE may determine power control parameters for simultaneous transmission of the two communications. If the first UE is capable of simultaneous transmission and reception, and if one of the two communications is a transmission by the first UE and the other communication is a reception by the first UE, then the first UE may determine a power control parameter for the transmission so as to mitigate self-interference with regard to the received communication.

As shown, the first UE may determine the resolution based at least in part on a priority rule. A priority rule may include a rule, a criterion, a configuration used to select a communication for transmission or reception, or a configuration used to determine a power control parameter for a communication associated with a collision. In some aspects, the first UE may receive information indicating the priority rule. For example, a base station may select a priority rule to be used. The base station may transmit information indicating the priority rule to the first UE. For example, the base station may indicate which priority rule, of a plurality of configured or specified priority rules (which may be configured using radio resource control (RRC) signaling or specified in a wireless communication specification), was selected (such as using downlink control information (DCI) or medium access control (MAC) signaling). As another example, the base station may configure the first UE to use the priority rule using RRC signaling.

In some aspects, the priority rule may be based at least in part on how the inter-UE coordination communication is triggered. For example, the priority rule may be dependent on the resource allocation mode of the first UE and/or how the inter-UE coordination request and report are triggered. In some aspects, the priority rule may be defined based at least in part on whether a coordination report is requested by the base station or a relay, is triggered by an inter-UE coordination request, or is determined autonomously by the first UE. For example, if the transmission of a coordination report triggered by a base station conflicts with the transmission of a PSFCH or a PSSCH, then the first UE may resolve the conflict by prioritizing the coordination report. In some aspects, conflicts between sidelink transmissions with Mode 1 resource allocation (e.g., base station based resource allocation) with dynamic scheduling and a base station triggered coordination report should be avoided and may be treated by the first UE as an error case.

In some aspects, the priority rule may indicate that the other communication (e.g., the sidelink transmission) is prioritized over the inter-UE coordination communication. In some aspects, the priority rule may indicate that the inter-UE coordination communication is prioritized over the other communication.

In some aspects, the priority rule may be based at least in part on respective priority levels of the inter-UE coordination communication and the other communication. For example, an inter-UE coordination request may be associated with a priority level, which may be specified by the inter-UE coordination request or by other signaling, or which may be associated with a resource on which the inter-UE coordination request is transmitted. In some aspects, the first UE may determine a priority level of a coordination report to be equal to a priority level of an inter-UE coordination request that triggers the coordination report. Furthermore, a sidelink communication, such as a PSSCH or a PSFCH, may be associated with a priority level. The first UE may determine the resolution of the collision based at least in part on the respective priority levels of the sidelink communication and the inter-UE coordination communication. For example, the first UE may prioritize a communication with a higher priority level and drop a communication with a lower priority level. As another example, the first UE may allocate transmit power or other power control parameters based at least in part on respective priority levels of the sidelink communication and the other communication.

In some aspects, the priority rule may be based at least in part on a cast type of the other communication. For example, the priority rule may be based at least in part on whether the other communication is a unicast communication, a groupcast communication, or a multicast communication. As another example, the priority rule may be based at least in part on whether the other communication comprises a PSFCH that is associated with the reception of unicast data or groupcast data. As still another example, the priority rule may be based at least in part on whether the inter-UE coordination communication is used to reserve resources for a unicast transmission, a groupcast transmission, or a broadcast transmission. As another example, the priority rule may be based at least in part on whether the inter-UE coordination message is sent to a single UE (unicast), a group of UEs (groupcast) or all the UEs (broadcast). In some aspects, the first UE may prioritize unicast transmissions over groupcast or broadcast transmissions. In some aspects, the first UE may prioritize broadcast transmissions over unicast or groupcast transmissions. In some aspects, the first UE may prioritize groupcast transmissions over unicast or broadcast transmissions.

In some aspects, the priority rule may be based at least in part on whether the inter-UE coordination communication and the other communication are associated with (e.g., intended for) a same user or a same set of users. For example, if the inter-UE coordination communication and the other communication are associated with the same set of users, then the first UE may prioritize the other communication, and if the inter-UE coordination communication and the other communication are associated with different users, then the first UE may prioritize the inter-UE coordination communication. For example, the if the first UE transmits a PSCCH, PSSCH, or PSFCH and the inter-UE coordination message to the same second UE, then the first UE may prioritize the PSCCH/PSSCH/PSFCH over the inter-UE coordination message.

In some aspects, the priority rule may be based at least in part on location information associated with the inter-UE coordination communication. For example, the first UE may prioritize an inter-UE coordination communication that satisfies a distance threshold (e.g., is associated with a location sufficiently close to the first UE), and may deprioritize an inter-UE coordination communication that fails to satisfy the distance threshold.

In some aspects, the priority rule may be based at least in part on a signal strength associated with an inter-UE coordination request of the inter-UE coordination communication. For example, an RSRP of the inter-UE coordination request, measured when receiving the request, can indicate a distance of the requesting UE (e.g., the second UE or another UE) from the first UE. This measured RSRP can be compared against a threshold to determine whether the corresponding coordination report should be prioritized relative to the other communication.

As shown by reference number 730, the first UE may perform at least one of the inter-UE coordination communication (e.g., transmitting the coordination request or report, or receiving the coordination request or report) or the sidelink transmission (e.g., transmitting or receiving the sidelink transmission) based at least in part on the resolution. For example, the first UE may transmit or receive a prioritized communication, of the inter-UE coordination communication and the other communication, and may drop a deprioritized communication. As another example, the first UE may transmit the inter-UE coordination communication and the other communication using respective power control parameters determined based at least in part on the resolution of the collision. The dashed arrow between the first UE and the second UE indicates that the first UE may or may not perform a communication with the second UE, depending on the resolution. For example, the first UE may drop a communication with the second UE, and may only transmit or receive a communication with another UE or a base station. Thus, the first UE determines a resolution for a collision between an inter-UE coordination communication and another communication, which improves resource utilization by reducing the occurrence of interference of a deprioritized communication with a prioritized communication.

As mentioned above, in example 800, the first UE and the base station may communicate with each other via a radio access interface, such as a Uu interface, on an uplink and/or a downlink. As shown in FIG. 8, and by reference number 810, the first UE may identify a collision between an inter-UE coordination communication and another communication. Here, the other communication is an uplink transmission or a downlink transmission, such as on a Uu interface. In some aspects, the inter-UE coordination communication and the other communication may both be between the first UE and the second UE. In some aspects, the inter-UE coordination communication and the other communication may be between the first UE and different UEs (e.g., one of the inter-UE coordination communication or the other communication may be between the first UE and a third UE not shown in FIG. 7). The inter-UE coordination communication may include an inter-UE coordination request, a coordination report (also referred to as an inter-UE coordination message), and/or the like. The other communication may include a transmission on a PUSCH, a PDSCH, a PUCCH, a PDCCH, and/or the like. The first UE may identify the collision based at least in part on respective resource allocations of the inter-UE coordination communication and the other communication, based at least in part on control information associated with the other communication, and/or the like.

As shown by reference number 820, the first UE may determine a resolution of the collision based at least in part on a priority rule. In some aspects, the first UE may apply one or more of the priority rules described with regard to example 700 to determine the resolution. For example, the first UE may determine whether to prioritize the inter-UE coordination communication or the other communication (e.g., the uplink or downlink communication) using a priority rule described with regard to example 700 for determining whether to prioritize an inter-UE coordination communication or a sidelink communication.

In some aspects, the priority rule may be based at least in part on a threshold priority level. For example, if the inter-UE coordination communication is associated with a threshold priority level, then the first UE may prioritize the inter-UE coordination communication, and if the inter-UE coordination communication is not associated with the threshold priority level, then the first UE may prioritize the other communication. In some aspects, the first UE may determine the resolution based at least in part on the threshold priority level based at least in part on a priority level for the other communication not being configured. For example, in the absence of a priority level for the other communication, the first UE may determine whether to prioritize the inter-UE coordination communication based at least in part on the threshold priority level. The threshold priority level can also be used to determine a resolution for a collision as described with regard to example 700 (e.g., between sidelink communications).

In some aspects, a priority rule described with regard to examples 700 and 800 may be configured for the first UE. For example, the priority rule may be configured for UEs separately, or may be preconfigured (e.g., by an equipment manufacturer) or specified by a wireless communication standard. In some aspects, a priority rule may be associated with a resource pool (e.g., may be configured for a resource pool). A resource pool may include a group of resources associated with an inter-UE coordination communication, a group of resources designated for sidelink communication, and/or the like. In some aspects, a priority rule may be associated with a carrier (e.g., may be configured for a carrier).

As shown by reference number 830, the first UE may perform at least one of the inter-UE coordination communication (e.g., transmitting the coordination request or report, or receiving the coordination request or report) or the uplink or downlink transmission (e.g., transmitting or receiving the uplink or downlink transmission) based at least in part on the resolution. For example, the first UE may transmit or receive a prioritized communication, of the inter-UE coordination communication and the other communication, and may drop a deprioritized communication. As another example, the first UE may transmit the inter-UE coordination communication and the other communication using respective power control parameters determined based at least in part on the resolution of the collision. The dashed arrows between the first UE and the second UE, and the first UE and the base station, indicate that the first UE may or may not perform a communication with the second UE and/or the base station depending on the resolution. Thus, the first UE determines a resolution for a collision between a inter-UE coordination communication and another communication, which improves resource utilization by reducing the occurrence of interference of a deprioritized communication with a prioritized communication.

As indicated above, FIGS. 7 and 8 are provided as examples. Other examples may differ from what is described with regard to FIGS. 7 and 8.

Figure 9:
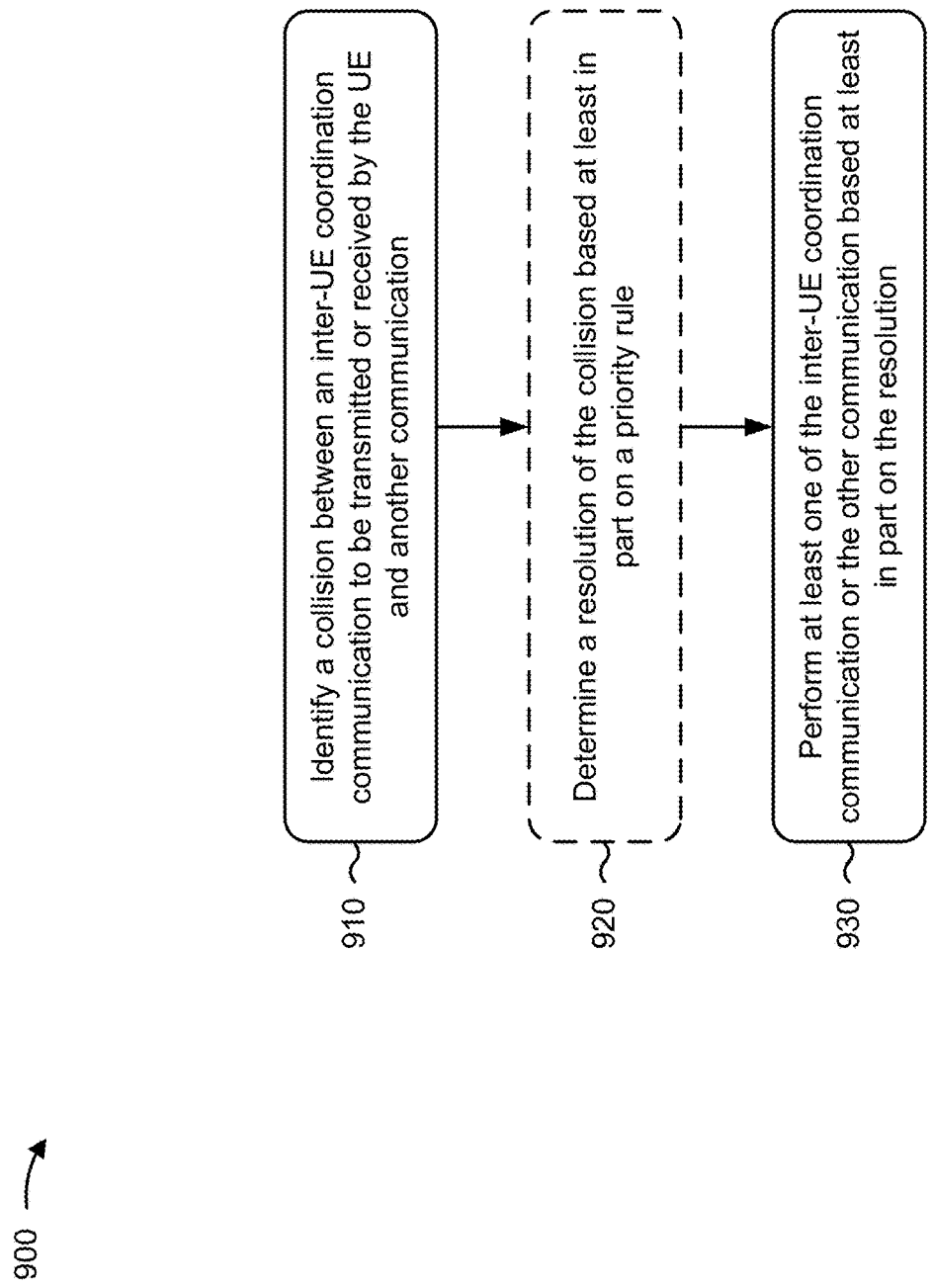
FIG. 9 is a diagram illustrating an example process performed, for example, by a UE, in accordance with the present disclosure.

FIG. 9 is a diagram illustrating an example process 900 performed, for example, by a UE, in accordance with the present disclosure. Example process 900 is an example where a first UE (e.g., UE 120, UE 305, UE 405) performs operations associated with sidelink collision handling for inter-UE coordination.

As shown in FIG. 9, in some aspects, process 900 may include identifying a collision between an inter-UE coordination communication to be transmitted or received by the UE and another communication (block 910). For example, the UE (e.g., using antenna 252, demodulator 254, MIMO detector 256, receive processor 258, transmit processor 264, TX MIMO processor 266, modulator 254, controller/processor 280, and/or memory 282) may identify a collision between an inter-UE coordination communication to be transmitted or received by the UE and another communication, as described above.

As further shown in FIG. 9, in some aspects, process 900 may optionally include determining a resolution of the collision based at least in part on a priority rule (block 920). For example, the UE (e.g., using antenna 252, demodulator 254, MIMO detector 256, receive processor 258, transmit processor 264, TX MIMO processor 266, modulator 254, controller/processor 280, and/or memory 282) may determine a resolution of the collision based at least in part on a priority rule, as described above.

As further shown in FIG. 9, in some aspects, process 900 may include performing at least one of the inter-UE coordination communication or the other communication based at least in part on the resolution (block 930). For example, the UE (e.g., using antenna 252, demodulator 254, MIMO detector 256, receive processor 258, transmit processor 264, TX MIMO processor 266, modulator 254, controller/processor 280, and/or memory 282) may perform at least one of the inter-UE coordination communication or the other communication based at least in part on the resolution, as described above. In some aspects, the UE may perform at least one of the inter-UE coordination communication or the other communication using a power control configuration determined based at least in part on the resolution.

Process 900 may include additional aspects, such as any single aspect or any combination of aspects described below and/or in connection with one or more other processes described elsewhere herein.

In a first aspect, the other communication is a sidelink transmission of the UE.

In a second aspect, alone or in combination with the first aspect, the priority rule is based at least in part on whether the inter-UE coordination communication is triggered by a base station, another UE associated with the inter-UE coordination communication, or a relay associated with the base station.

In a third aspect, alone or in combination with one or more of the first and second aspects, the priority rule indicates that an inter-UE coordination communication triggered by the base station is to be prioritized over the other communication.

In a fourth aspect, alone or in combination with one or more of the first through third aspects, the priority rule indicates that the other communication is prioritized over the inter-UE coordination communication.

In a fifth aspect, alone or in combination with one or more of the first through fourth aspects, the priority rule indicates that the inter-UE coordination communication is prioritized over the other communication.

In a sixth aspect, alone or in combination with one or more of the first through fifth aspects, the priority rule is based at least in part on respective priority levels associated with the inter-UE coordination communication and the other communication.

In a seventh aspect, alone or in combination with one or more of the first through sixth aspects, the inter-UE coordination communication comprises a coordination report, and a priority level of the coordination report is based at least in part on a priority level of a coordination request that triggers the coordination report.

In an eighth aspect, alone or in combination with one or more of the first through seventh aspects, determining the resolution is based at least in part on comparing one or more of the respective priority levels to a threshold priority level, wherein the threshold priority level is based at least in part on whether a priority level for an uplink communication or a downlink communication is configured.

In a ninth aspect, alone or in combination with one or more of the first through eighth aspects, the priority rule is based at least in part on whether the inter-UE coordination communication is associated with a unicast communication, a groupcast communication, or a broadcast communication.

In a tenth aspect, alone or in combination with one or more of the first through ninth aspects, the priority rule is based at least in part on whether the other communication is a unicast communication, a groupcast communication, or a broadcast communication.

In an eleventh aspect, alone or in combination with one or more of the first through tenth aspects, the priority rule is based at least in part on whether the inter-UE coordination communication and the other communication are associated with a same user or different users.

In a twelfth aspect, alone or in combination with one or more of the first through eleventh aspects, the priority rule is based at least in part on location information associated with the inter-UE coordination communication.

In a thirteenth aspect, alone or in combination with one or more of the first through twelfth aspects, the inter-UE coordination communication comprises a coordination report, and a priority level of the coordination report is based at least in part on a signal strength associated with a coordination request that triggered the coordination report.

In a fourteenth aspect, alone or in combination with one or more of the first through thirteenth aspects, the other communication is an uplink communication or a downlink communication.

In a fifteenth aspect, alone or in combination with one or more of the first through fourteenth aspects, the priority rule is based at least in part on a configuration specific to the UE.

In a sixteenth aspect, alone or in combination with one or more of the first through fifteenth aspects, performing at least one of the inter-UE coordination communication or the other communication based at least in part on the resolution comprises performing at least one of the inter-UE coordination communication or the other communication using a power control configuration determined based at least in part on the resolution.

In a seventeenth aspect, alone or in combination with one or more of the first through sixteenth aspects, the priority rule is based at least in part on whether the other communication is triggered by a base station, another UE associated with the other communication, or a relay associated with the base station Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
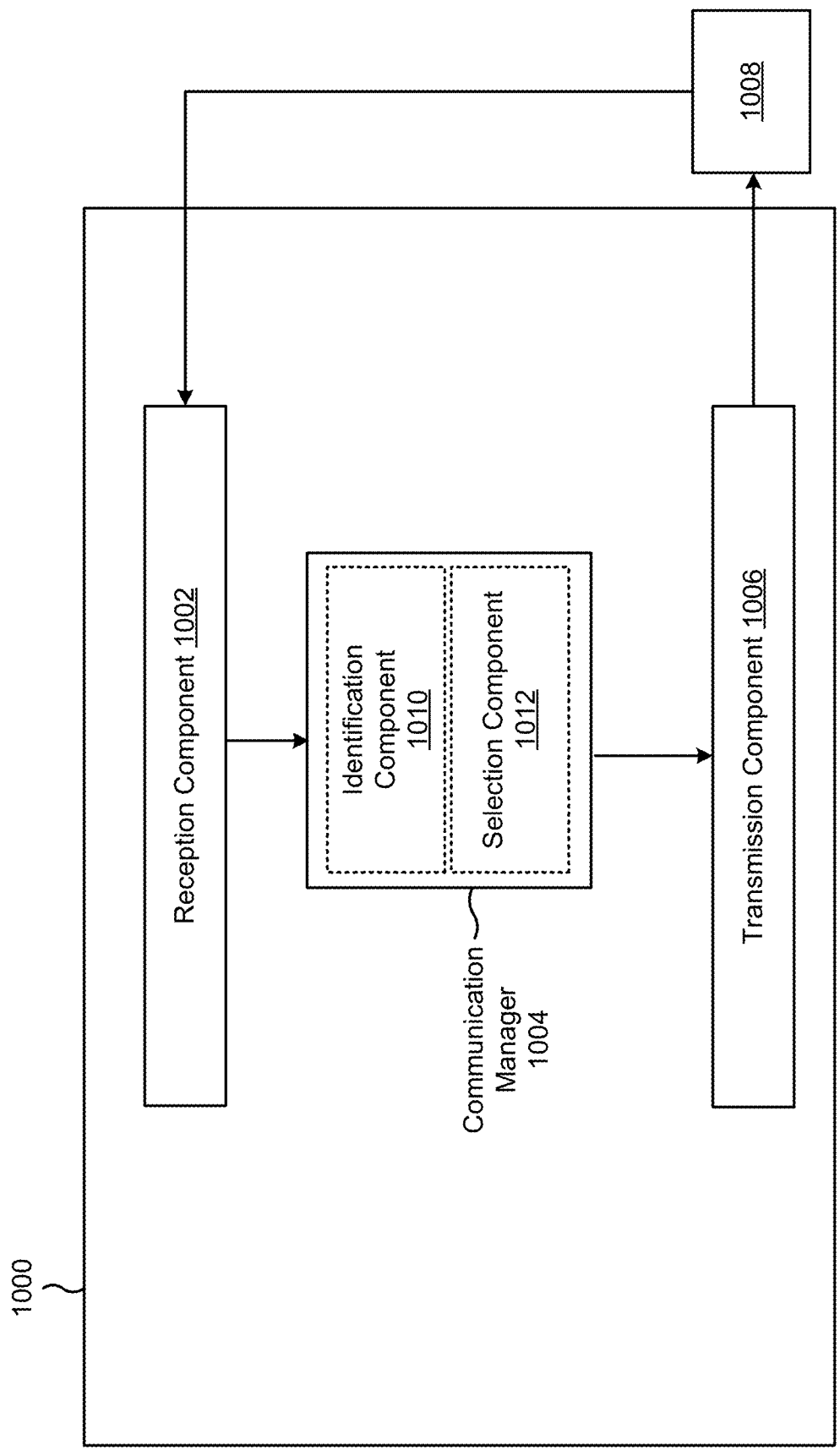
FIG. 10 is a block diagram of an example apparatus for wireless communication in accordance with the present disclosure.

FIG. 10 is a block diagram of an example apparatus 1000 for wireless communication in accordance with the present disclosure. The apparatus 1000 may be a UE, or a UE may include the apparatus 1000. In some aspects, the apparatus 1000 includes a reception component 1002, a communication manager 1004, and a transmission component 1006, which may be in communication with one another (for example, via one or more buses). As shown, the apparatus 1000 may communicate with another apparatus 1008 (such as a UE, a base station, or another wireless communication device) using the reception component 1002 and the transmission component 1006.

In some aspects, the apparatus 1000 may be configured to perform one or more operations described herein in connection with FIGS. 7-8. Additionally or alternatively, the apparatus 1000 may be configured to perform one or more processes described herein, such as process 900 of FIG. 9, or a combination thereof. In some aspects, the apparatus 1000 may include one or more components of the UE described above in connection with FIG. 2.

The reception component 1002 may provide means for receiving communications, such as reference signals, control information, data communications, or a combination thereof, from the apparatus 1008. The reception component 1002 may provide received communications to one or more other components of the apparatus 1000, such as the communication manager 1004. In some aspects, the reception component 1002 may provide means for performing signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1002 may include one or more antennas, a demodulator, a MIMO detector, a receive processor, a controller/processor, a memory, or a combination thereof, of the UE described above in connection with FIG. 2.

The transmission component 1006 may provide means for transmitting communications, such as reference signals, control information, data communications, or a combination thereof, to the apparatus 1008. In some aspects, the communication manager 1004 may generate communications and may transmit the generated communications to the transmission component 1006 for transmission to the apparatus 1008. In some aspects, the transmission component 1006 may provide means for performing signal processing on the generated communications (such as filtering, amplification, modulation, digital-to-analog conversion, multiplexing, interleaving, mapping, or encoding, among other examples), and may transmit the processed signals to the apparatus 1008. In some aspects, the transmission component 1006 may include one or more antennas, a modulator, a transmit MIMO processor, a transmit processor, a controller/processor, a memory, or a combination thereof, of the UE described above in connection with FIG. 2. In some aspects, the transmission component 1006 may be co-located with the reception component 1002 in a transceiver.

The communication manager 1004 may provide means for identifying a collision between an inter-UE coordination communication to be transmitted or received by the UE and another communication; means for determining a resolution of the collision based at least in part on a priority rule; and means for performing at least one of the inter-UE coordination communication or the other communication based at least in part on the resolution. In some aspects, the communication manager 1004 may include a controller/processor, a memory, or a combination thereof, of the UE described above in connection with FIG. 2.

In some aspects, the communication manager 1004 may include a set of components, such as an identification component 1010, a determination component 1012, or a combination thereof. Alternatively, the set of components may be separate and distinct from the communication manager 1004.

In some aspects, the communication manager 1004 and/or one or more components of the set of components may include or may be implemented within hardware (e.g., circuitry described in connection with FIG. 12). In some aspects, the communication manager 1004 and/or one or more components of the set of components may include or may be implemented within a controller/processor, a memory, or a combination thereof, of the UE 120 described above in connection with FIG. 2.

In some aspects, the communication manager 1004 and/or one or more components of the set of components may be implemented in code (e.g., as software or firmware stored in a memory), such as the code described in connection with FIG. 12. For example, the communication manager 1004 and/or a component (or a portion of a component) may be implemented as instructions or code stored in a non-transitory computer-readable medium and executable by a controller or a processor to perform the functions or operations of the communication manager 1004 and/or the component.

If implemented in code, the functions of the communication manager 1004 and/or a component may be executed by a controller/processor, a memory, a scheduler, a communication unit, or a combination thereof, of the UE 120 described above in connection with FIG. 2.

In some aspects, one or more components of the set of components may include or may be implemented within a controller/processor, a memory, or a combination thereof, of the UE described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The identification component 1010 may provide means for identifying a collision between an inter-UE coordination communication to be transmitted or received by the UE and another communication. The determination component 1012 may provide means for determining a resolution of the collision based at least in part on a priority rule. The reception component 1002 and/or the transmission component 1006 may provide means for performing at least one of the inter-UE coordination communication or the other communication based at least in part on the resolution.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally or alternatively, a set of (one or more) components shown in FIG. 10 may perform one or more functions described as being performed by another set of components shown in FIG. 10.

Figure 11:
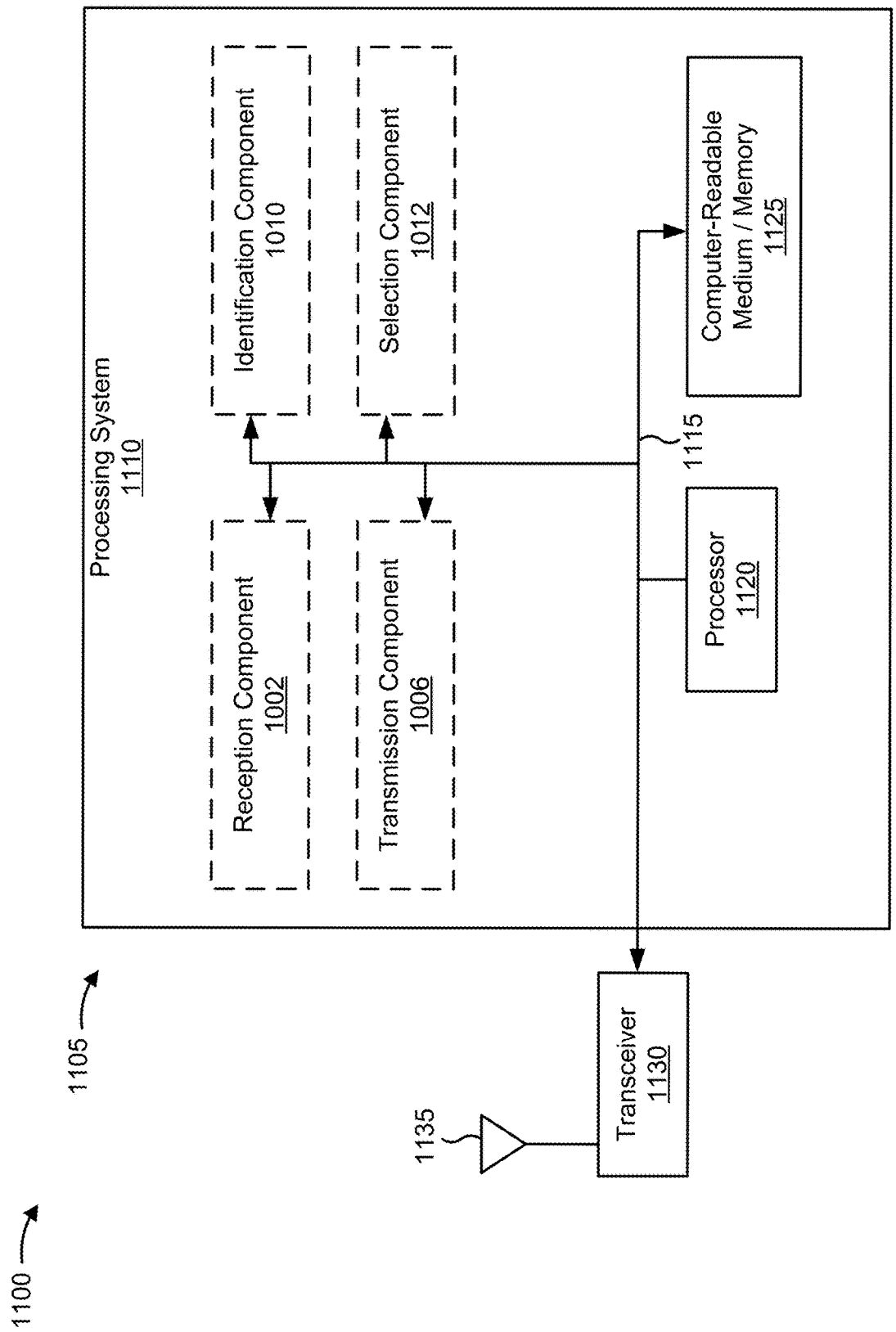
FIG. 11 is a diagram illustrating an example of a hardware implementation for an apparatus employing a processing system.

FIG. 11 is a diagram illustrating an example 1100 of a hardware implementation for an apparatus 1105 employing a processing system 1110. The apparatus 1105 may be a UE.

The processing system 1110 may be implemented with a bus architecture, represented generally by the bus 1115. The bus 1115 may include any number of interconnecting buses and bridges depending on the specific application of the processing system 1110 and the overall design constraints. The bus 1115 links together various circuits including one or more processors and/or hardware components, represented by the processor 1120, the illustrated components, and the computer-readable medium/memory 1125. The bus 1115 may also link various other circuits, such as timing sources, peripherals, voltage regulators, power management circuits, and/or the like.

The processing system 1110 may be coupled to a transceiver 1130. The transceiver 1130 is coupled to one or more antennas 1135. The transceiver 1130 provides a means for communicating with various other apparatuses over a transmission medium. The transceiver 1130 receives a signal from the one or more antennas 1135, extracts information from the received signal, and provides the extracted information to the processing system 1110, specifically the reception component 1002. In addition, the transceiver 1130 receives information from the processing system 1110, specifically the transmission component 1006, and generates a signal to be applied to the one or more antennas 1135 based at least in part on the received information.

The processing system 1110 includes a processor 1120 coupled to a computer-readable medium/memory 1125. The processor 1120 is responsible for general processing, including the execution of software stored on the computer-readable medium/memory 1125. The software, when executed by the processor 1120, causes the processing system 1110 to perform the various functions described herein for any particular apparatus. The computer-readable medium/memory 1125 may also be used for storing data that is manipulated by the processor 1120 when executing software. The processing system further includes at least one of the illustrated components. The components may be software modules running in the processor 1120, resident/stored in the computer-readable medium/memory 1125, one or more hardware modules coupled to the processor 1120, or some combination thereof.

In some aspects, the processing system 1110 may be a component of the UE 120 and may include the memory 282 and/or at least one of the TX MIMO processor 266, the RX processor 258, and/or the controller/processor 280. In some aspects, the apparatus 1105 for wireless communication includes means for identifying a collision between an inter-UE coordination communication to be transmitted or received by the UE and another communication; means for determining a resolution of the collision based at least in part on a priority rule; and means for performing at least one of the inter-UE coordination communication or the other communication based at least in part on the resolution. The aforementioned means may be one or more of the aforementioned components of the apparatus 1000 and/or the processing system 1110 of the apparatus 1105 configured to perform the functions recited by the aforementioned means. As described elsewhere herein, the processing system 1110 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 11 is provided as an example. Other examples may differ from what is described in connection with FIG. 11.

Figure 12:
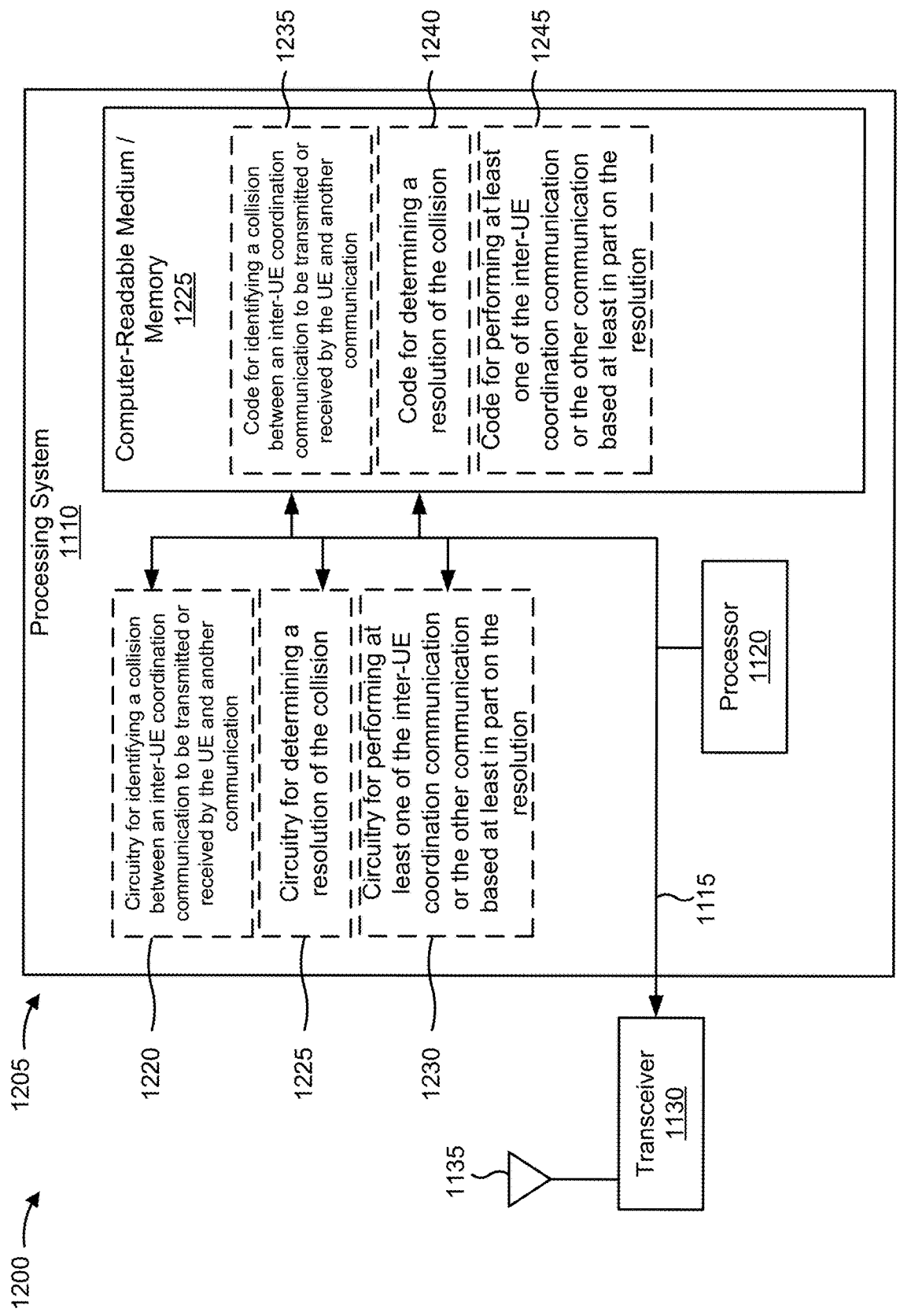
FIG. 12 is a diagram illustrating an example of an implementation of code and circuitry for an apparatus.

FIG. 12 is a diagram illustrating an example 1200 of an implementation of code and circuitry for an apparatus 1205. The apparatus 1205 may be a UE.

As further shown in FIG. 12, the apparatus may include circuitry for identifying a collision between an inter-UE coordination communication to be transmitted or received by the UE and another communication (circuitry 1220). For example, the apparatus may include circuitry to enable the apparatus to identify a collision between an inter-UE coordination communication to be transmitted or received by the UE and another communication.

As further shown in FIG. 12, the apparatus may include circuitry for determining a resolution of the collision (circuitry 1225). For example, the apparatus may include circuitry to enable the apparatus to determine a resolution of the collision.

As further shown in FIG. 12, the apparatus may include circuitry for performing at least one of the inter-UE coordination communication or the other communication based at least in part on the resolution (circuitry 1230). For example, the apparatus may include circuitry to enable the apparatus to perform at least one of the inter-UE coordination communication or the other communication based at least in part on the resolution.

As further shown in FIG. 12, the apparatus may include, stored in computer-readable medium 1125, code for identifying a collision between an inter-UE coordination communication to be transmitted or received by the UE and another communication (code 1235). For example, the apparatus may include code that, when executed by the processor 1120, may cause the processor 1120 to identify a collision between an inter-UE coordination communication to be transmitted or received by the UE and another communication.

As further shown in FIG. 12, the apparatus may include, stored in computer-readable medium 1125, code for determining a resolution of the collision (code 1240). For example, the apparatus may include code that, when executed by the processor 1120, may cause the transceiver 1130 to perform at least one of the inter-UE coordination communication or the other communication based at least in part on the resolution.

As further shown in FIG. 12, the apparatus may include, stored in computer-readable medium 1125, code for performing at least one of the inter-UE coordination communication or the other communication based at least in part on the resolution (code 1245). For example, the apparatus may include code that, when executed by the processor 1120, may cause the processor 1120 to perform at least one of the inter-UE coordination communication or the other communication based at least in part on the resolution.

FIG. 12 is provided as an example. Other examples may differ from what is described in connection with FIG. 12.

Figure 13:
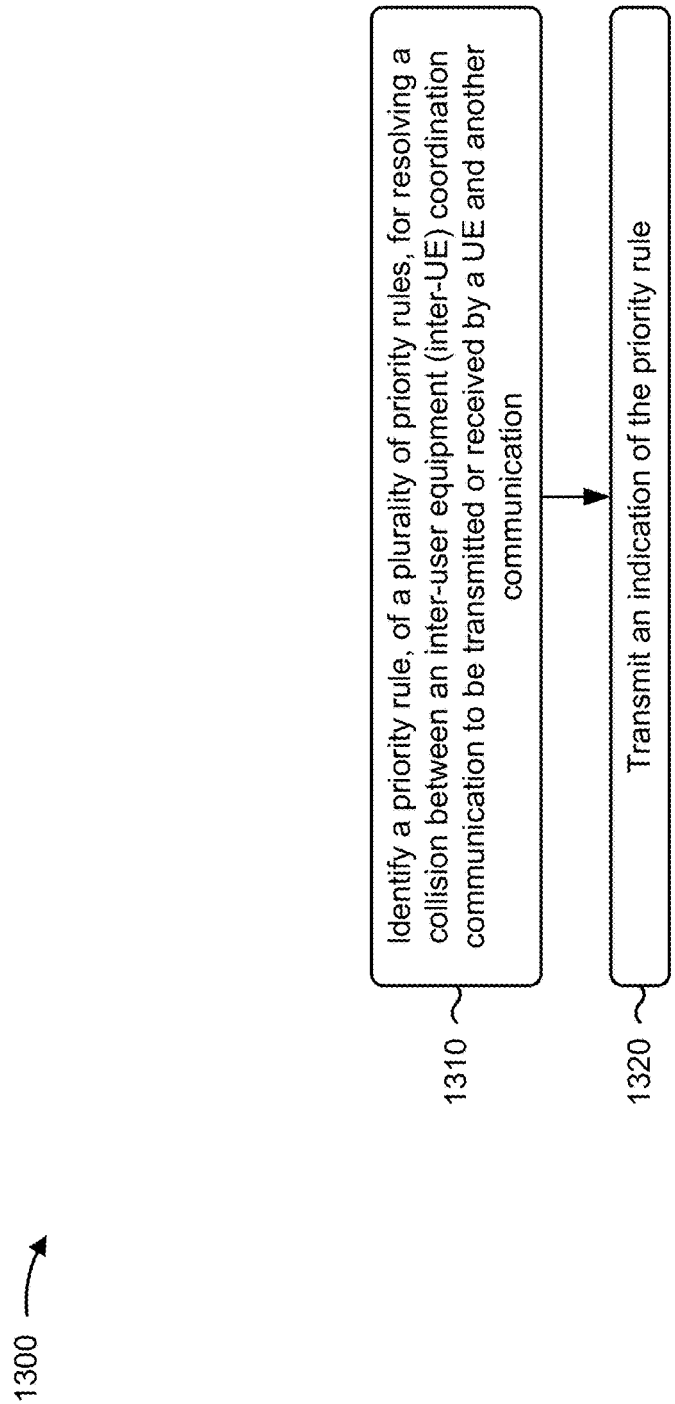
FIG. 13 is a diagram illustrating an example process performed, for example, by a base station, in accordance with the present disclosure.

FIG. 13 is a diagram illustrating an example process 1300 performed, for example, by a base station, in accordance with the present disclosure. Example process 1300 is an example where the base station (e.g., base station 110) performs operations associated with sidelink collision handling for inter user equipment coordination.

As shown in FIG. 13, in some aspects, process 1300 may include identifying a priority rule, of a plurality of priority rules, for resolving a collision between an inter-user equipment (inter-UE) coordination communication to be transmitted or received by a UE and another communication (block 1310). For example, the base station (e.g., using identification component 1408, depicted in FIG. 14) may identify a priority rule, of a plurality of priority rules, for resolving a collision between an inter-UE coordination communication to be transmitted or received by a UE and another communication, as described above. The plurality of priority rules may be configured by the base station or may be specified, such as in a wireless communication specification.

As further shown in FIG. 13, in some aspects, process 1300 may include transmitting an indication of the priority rule (block 1320). For example, the base station (e.g., using transmission component 1404, depicted in FIG. 14) may transmit an indication of the priority rule, as described above. The base station may transmit the indication of the priority rule using RRC signaling, MAC signaling, DCI, or a combination thereof. For example, the base station may configure a priority rule via RRC signaling. As another example, the base station may configure a plurality of priority rules via RRC signaling and may select one of the configured priority rules via MAC signaling or DCI. A plurality of priority rules and/or a priority rule can be configured on a per UE basis, for a group of UEs, for a resource pool, for a component carrier, for a cast type, for a particular communication, for a priority level of a communication, or the like.

Process 1300 may include additional aspects, such as any single aspect or any combination of aspects described below and/or in connection with one or more other processes described elsewhere herein.

In a first aspect, the other communication is a sidelink transmission of the UE.

In a second aspect, alone or in combination with the first aspect, the priority rule is based at least in part on whether the inter-UE coordination communication is triggered by the base station, another UE associated with the inter-UE coordination communication, or a relay associated with the base station.

In a third aspect, alone or in combination with one or more of the first and second aspects, the priority rule indicates that an inter-UE coordination communication triggered by the base station is to be prioritized over the other communication.

In a fourth aspect, alone or in combination with one or more of the first through third aspects, the priority rule indicates that the other communication is prioritized over the inter-UE coordination communication.

In a fifth aspect, alone or in combination with one or more of the first through fourth aspects, the priority rule indicates that the inter-UE coordination communication is prioritized over the other communication.

In a sixth aspect, alone or in combination with one or more of the first through fifth aspects, the priority rule is based at least in part on respective priority levels associated with the inter-UE coordination communication and the other communication.

In a seventh aspect, alone or in combination with one or more of the first through sixth aspects, the inter-UE coordination communication comprises a coordination report, and wherein a priority level of the coordination report is based at least in part on a priority level of a coordination request that triggers the coordination report.

In an eighth aspect, alone or in combination with one or more of the first through seventh aspects, the resolution is based at least in part on comparing one or more of the respective priority levels to a threshold priority level, wherein the threshold priority level is based at least in part on whether a priority level for an uplink communication or a downlink communication is configured.

In a ninth aspect, alone or in combination with one or more of the first through eighth aspects, the priority rule is based at least in part on whether the inter-UE coordination communication is associated with a unicast communication, a groupcast communication, or a broadcast communication.

In a tenth aspect, alone or in combination with one or more of the first through ninth aspects, the priority rule is based at least in part on whether the other communication is a unicast communication, a groupcast communication, or a broadcast communication.

In an eleventh aspect, alone or in combination with one or more of the first through tenth aspects, the priority rule is based at least in part on whether the inter-UE coordination communication and the other communication are associated with a same user or different users.

In a twelfth aspect, alone or in combination with one or more of the first through eleventh aspects, the priority rule is based at least in part on location information associated with the inter-UE coordination communication.

In a thirteenth aspect, alone or in combination with one or more of the first through twelfth aspects, the inter-UE coordination communication comprises a coordination report, and wherein a priority level of the coordination report is based at least in part on a signal strength associated with a coordination request that triggered the coordination report.

In a fourteenth aspect, alone or in combination with one or more of the first through thirteenth aspects, the other communication is an uplink communication or a downlink communication.

In a fifteenth aspect, alone or in combination with one or more of the first through fourteenth aspects, the priority rule is based at least in part on a configuration specific to the UE.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
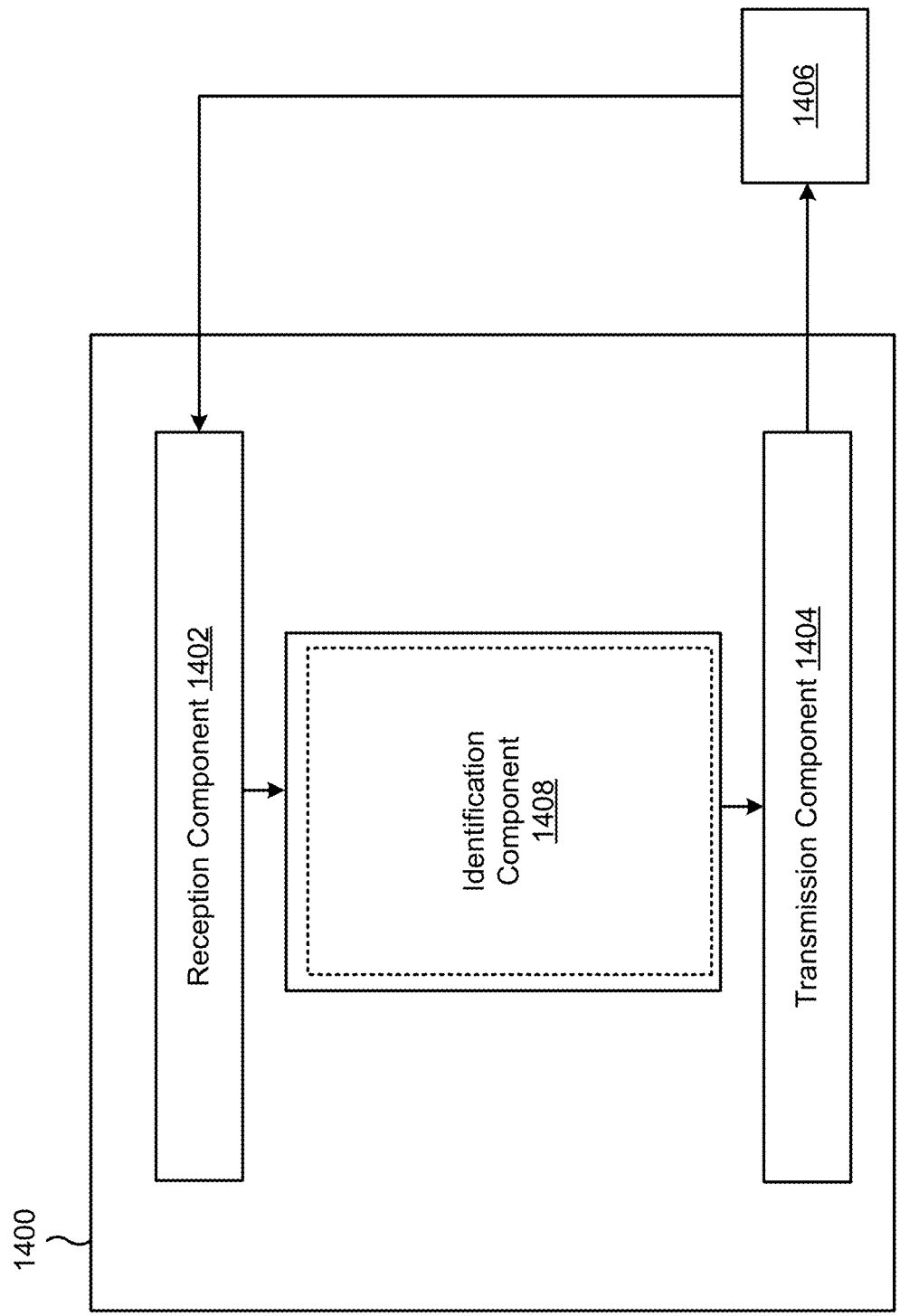
FIG. 14 is a diagram illustrating an example of a hardware implementation for an apparatus employing a processing system.

FIG. 14 is a diagram of an example apparatus 1400 for wireless communication, in accordance with the present disclosure. The apparatus 1400 may be a base station, or a base station may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404. As further shown, the apparatus 1400 may include an identification component 1408, among other examples.

In some aspects, the apparatus 1400 may be configured to perform one or more operations described herein in connection with FIGS. 3-8. Additionally, or alternatively, the apparatus 1400 may be configured to perform one or more processes described herein, such as process 1300 of FIG. 13, or a combination thereof. In some aspects, the apparatus 1400 and/or one or more components shown in FIG. 14 may include one or more components of the base station described in connection with FIG. 2. Additionally, or alternatively, one or more components shown in FIG. 14 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1406. In some aspects, the reception component 1402 may include one or more antennas, a modem, a demodulator, a MIMO detector, a receive processor, a controller/processor, a memory, or a combination thereof, of the base station described in connection with FIG. 2.

The transmission component 1404 may transmit communications, such as reference signals, control information, data communications, or a combination thereof, to the apparatus 1406. In some aspects, one or more other components of the apparatus 1406 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modem, a modulator, a transmit MIMO processor, a transmit processor, a controller/processor, a memory, or a combination thereof, of the base station described in connection with FIG. 2. In some aspects, the transmission component 1404 may be co-located with the reception component 1402 in a transceiver.

The identification component 1408 may identify a priority rule, of a plurality of priority rules, for resolving a collision between an inter-user equipment (inter-UE) coordination communication to be transmitted or received by a UE and another communication. The transmission component 1404 may transmit an indication of the priority rule.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

The following provides an overview of some Aspects of the present disclosure:

Aspect 1: A method of wireless communication performed by a user equipment (UE), comprising: identifying a collision between an inter-UE coordination communication to be transmitted or received by the UE and another communication; and performing at least one of the inter-UE coordination communication or the other communication based at least in part on a resolution of the collision that is based at least in part on a priority rule.

Aspect 2: The method of Aspect 1, wherein the other communication is a sidelink transmission of the UE.

Aspect 3: The method of any of Aspects 1-2, wherein the priority rule is based at least in part on whether the inter-UE coordination communication is triggered by a base station, another UE associated with the inter-UE coordination communication, or a relay associated with the base station.

Aspect 4: The method of Aspect 3, wherein the priority rule indicates that an inter-UE coordination communication triggered by the base station is to be prioritized over the other communication.

Aspect 5: The method of any of Aspects 1-4, wherein the priority rule is based at least in part on whether the other communication is triggered by a base station, another UE associated with the other communication, or a relay associated with the base station.

Aspect 6: The method of any of Aspects 1-3, wherein the priority rule indicates that the other communication is prioritized over the inter-UE coordination communication.

Aspect 7: The method of any of Aspects 1-5, wherein the priority rule indicates that the inter-UE coordination communication is prioritized over the other communication.

Aspect 8: The method of any of Aspects 1-7, wherein the priority rule is based at least in part on respective priority levels associated with the inter-UE coordination communication and the other communication.

Aspect 9: The method of Aspect 8, wherein the inter-UE coordination communication comprises a coordination report, and wherein a priority level of the coordination report is based at least in part on a priority level of a coordination request that triggers the coordination report.

Aspect 10: The method of Aspect 8, wherein the resolution is based at least in part on comparing one or more of the respective priority levels to a threshold priority level, wherein the threshold priority level is based at least in part on whether a priority level for an uplink communication or a downlink communication is configured.

Aspect 11: The method of any of Aspects 1-10, wherein the priority rule is based at least in part on whether the inter-UE coordination communication is associated with a unicast communication, a groupcast communication, or a broadcast communication.

Aspect 12: The method of any of Aspects 1-11, wherein the priority rule is based at least in part on whether the other communication is a unicast communication, a groupcast communication, or a broadcast communication.

Aspect 13: The method of any of Aspects 1-12, wherein the priority rule is based at least in part on whether the inter-UE coordination communication and the other communication are associated with a same user or different users.

Aspect 14: The method of any of Aspects 1-13, wherein the priority rule is based at least in part on location information associated with the inter-UE coordination communication.

Aspect 15: The method of any of Aspects 1-14, wherein the inter-UE coordination communication comprises a coordination report, and wherein a priority level of the coordination report is based at least in part on a signal strength associated with a coordination request that triggered the coordination report.

Aspect 16: The method of any of Aspects 1-15, wherein the other communication is an uplink communication or a downlink communication.

Aspect 17: The method of any of Aspects 1-16, wherein the priority rule is based at least in part on a configuration specific to the UE.

Aspect 18: The method of any of Aspects 1-17, wherein performing at least one of the inter-UE coordination communication or the other communication based at least in part on the resolution comprises: performing at least one of the inter-UE coordination communication or the other communication using a power control configuration determined based at least in part on the resolution.

Aspect 19: A method of wireless communication performed by a base station, comprising: identifying a priority rule, of a plurality of priority rules, for resolving a collision between an inter-user equipment (inter-UE) coordination communication to be transmitted or received by a UE and another communication; and transmitting an indication of the priority rule.

Aspect 20: The method of Aspect 19, wherein the other communication is a sidelink transmission of the UE.

Aspect 21: The method of any of Aspects 19-20, wherein the priority rule is identified based at least in part on whether the inter-UE coordination communication is triggered by the base station, another UE associated with the inter-UE coordination communication, or a relay associated with the base station.

Aspect 22: The method of Aspect 21, wherein the priority rule indicates that an inter-UE coordination communication triggered by the base station is to be prioritized over the other communication.

Aspect 23: The method of any of Aspects 19-22, wherein the inter-UE coordination communication comprises a coordination report, and wherein a priority level of the coordination report is based at least in part on a signal strength associated with a coordination request that triggered the coordination report.

Aspect 24: The method of any of Aspects 19-23, wherein the other communication is an uplink communication or a downlink communication.

Aspect 25: The method of any of Aspects 19-24, wherein the priority rule is based at least in part on a configuration specific to the UE.

Aspect 26: An apparatus for wireless communication at a device, comprising a processor; memory coupled with the processor; and instructions stored in the memory and executable by the processor to cause the apparatus to perform the method of one or more of Aspects 1-25.

Aspect 27: A device for wireless communication, comprising a memory and one or more processors coupled to the memory, the one or more processors configured to perform the method of one or more of Aspects 1-25.

Aspect 28: An apparatus for wireless communication, comprising at least one means for performing the method of one or more of Aspects 1-25.

Aspect 29: A non-transitory computer-readable medium storing code for wireless communication, the code comprising instructions executable by a processor to perform the method of one or more of Aspects 1-25.

Aspect 30: A non-transitory computer-readable medium storing a set of instructions for wireless communication, the set of instructions comprising one or more instructions that, when executed by one or more processors of a device, cause the device to perform the method of one or more of Aspects 1-25.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
   one or more memories; and
   one or more processors, coupled to the one or more memories, configured, individually or collectively, to:
   identify a collision between an inter-UE coordination communication to be transmitted by the UE and a second communication, wherein the inter-UE coordination communication corresponds to a set of sidelink resources for resource allocation;
   perform a prioritized transmission, of the inter-UE coordination communication or the second communication, based at least in part on a resolution of the collision, wherein the resolution is based at least in part on a priority of the inter-UE coordination communication, and wherein the priority of the inter-UE coordination communication is based at least in part on the inter-UE coordination communication being triggered by an inter-UE coordination request from another UE, and wherein the priority of the inter-UE coordination communication is equal to a priority level of the inter-UE coordination request; and
   perform a deprioritized transmission, of the inter-UE coordination communication or the second communication, using a power control parameter based at least in part on the resolution, or drop the deprioritized transmission.

2. The apparatus of claim 1, wherein the second communication is a sidelink transmission of the UE.

3. The apparatus of claim 1, wherein the second communication is prioritized over the inter-UE coordination communication based at least in part on a priority of the second communication.

4. The apparatus of claim 1, wherein the inter-UE coordination communication is prioritized over the second communication based at least in part on the priority of the inter-UE coordination communication.

5. The apparatus of claim 1, wherein the resolution is based at least in part on respective priority levels associated with the inter-UE coordination communication and the second communication.

6. The apparatus of claim 5, wherein the resolution is based at least in part on comparing one or more of the respective priority levels to a threshold priority level, wherein the threshold priority level is based at least in part on whether a priority level for an uplink communication or a downlink communication is configured.

7. The apparatus of claim 5, wherein a priority level of the second communication, of the respective priority levels is based at least in part on whether the second communication comprises a physical sidelink feedback channel that is associated with a reception of groupcast data.

8. The apparatus of claim 5, wherein a priority level of the second communication, of the respective priority levels, is based at least in part on whether the second communication is associated with a unicast communication, a groupcast communication, or a broadcast communication.

9. The apparatus of claim 5, wherein a priority level of the second communication, of the respective priority levels, is based at least in part on whether the inter-UE coordination communication and the second communication are associated with a same user or different users.

10. The apparatus of claim 1, wherein the second communication is an uplink communication.

11. The apparatus of claim 1, wherein the one or more processors are configured to:
   receive information indicating a priority rule based at least in part on a configuration specific to the UE, wherein the priority rule is based at least in part on the priority of the inter-UE coordination communication.

12. The apparatus of claim 1, wherein the power control parameter is a first power control parameter, and wherein the one or more processors, to perform the prioritized transmission, are configured to:
   perform the prioritized transmission using a second power control parameter based at least in part on the resolution.

13. An apparatus for wireless communication at a base station, comprising:
   one or more memories; and
   one or more processors, coupled to the one or more memories, configured, individually or collectively, to:
   identify a priority rule, of a plurality of priority rules, for resolving a collision between an inter-user equipment (inter-UE) coordination communication to be transmitted by a UE and a second communication, wherein the priority rule includes a configuration corresponding to one or more power control parameters for at least one of the inter-UE coordination communication or the second communication, wherein the priority rule indicates that a priority of the inter-UE coordination communication is based at least in part on the inter-UE coordination communication being triggered by an inter-UE coordination request from another UE, and wherein the priority of the inter-UE coordination communication is equal to a priority level of the inter-UE coordination request; and transmit an indication of the priority rule using downlink control information (DCI) signaling, radio resource control (RRC) signaling, or medium access control (MAC) signaling.

14. The apparatus of claim 13, wherein the second communication is a sidelink transmission of the UE.

15. The apparatus of claim 13, wherein the priority rule is identified based at least in part on whether the inter-UE coordination communication is triggered by a relay associated with the base station.

16. The apparatus of claim 15, wherein the priority rule indicates that an inter-UE coordination report triggered by the base station is to be prioritized over the second communication.

17. The apparatus of claim 13, wherein the second communication is an uplink communication.

18. The apparatus of claim 13, wherein the priority rule is based at least in part on a configuration specific to the UE.

19. A method of wireless communication performed by a user equipment (UE), comprising:
identifying a collision between an inter-UE coordination communication to be transmitted by the UE and a second communication, wherein the inter-UE coordination communication corresponds to a set of sidelink resources for resource allocation;
performing a prioritized transmission, of the inter-UE coordination communication or the second communication, based at least in part on a resolution of the collision, wherein the resolution is based at least in part on a priority rule, wherein the priority rule indicates that a priority of the inter-UE coordination communication is based at least in part on the inter-UE coordination communication being triggered by an inter-UE coordination request from another UE, and wherein the priority of the inter-UE coordination communication is equal to a priority level of the inter-UE coordination request; and
performing a deprioritized -transmission, of the inter-UE coordination communication or the second communication, using a power control parameter based at least in part on the resolution, or dropping the deprioritized-communication transmission.

20. A method of wireless performed by a base station, comprising:
identifying a priority rule, of a plurality of priority rules, for resolving a collision between an inter-user equipment (inter-UE) coordination communication to be transmitted by a UE and a second communication, wherein the priority rule includes a configuration corresponding to one or more power control parameters for at least one of the inter-UE coordination communication or the second communication, wherein the priority rule indicates that a priority of the inter-UE coordination communication is based at least in part on the inter-UE coordination communication being triggered by an inter-UE coordination request from another UE, and wherein the priority of the inter-UE coordination communication is equal to a priority level of the inter-UE coordination request; and
transmitting an indication of the priority rule using downlink control information (DCI) signaling, radio resource control (RRC) signaling, or medium access control (MAC) signaling.

21. The method of claim 20, wherein the second communication is a sidelink transmission of the UE.

22. The method of claim 19, wherein a priority level of the second communication is based at least in part on whether the second communication comprises a physical sidelink feedback channel, and wherein the priority of the inter-UE coordination communication is based at least in part on the priority level of the second communication.

23. The method of claim 19, wherein the resolution of the collision is based at least in part on a simultaneous transmission or reception capability of the UE.

24. The method of claim 19, wherein the inter-UE coordination communication comprises a coordination report indicating a set of available resources for sidelink communication.

25. The apparatus of claim 1, wherein the inter-UE coordination communication comprises a coordination report indicating a set of available resources for sidelink communication.

26. The apparatus of claim 13, wherein the inter-UE coordination communication comprises a coordination report indicating a set of available resources for sidelink communication.

* * * * *